(12) United States Patent
Toya et al.

(10) Patent No.: US 10,601,084 B2
(45) Date of Patent: Mar. 24, 2020

(54) STORAGE BATTERY PACK AND METHOD OF OPERATING THE SAME

(71) Applicant: PANASONIC INTELLECTUAL PROPERTY MANAGEMENT CO., LTD., Osaka (JP)

(72) Inventors: Shoichi Toya, Hyogo (JP); Kazuya Ohshima, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/591,243

(22) Filed: Oct. 2, 2019

(65) Prior Publication Data

US 2020/0036055 A1 Jan. 30, 2020

Related U.S. Application Data

(63) Continuation of application No. 15/277,363, filed on Sep. 27, 2016, now Pat. No. 10,476,113, which is a
(Continued)

(30) Foreign Application Priority Data

Jul. 11, 2014 (JP) .................................. 2014-143622
Feb. 27, 2015 (JP) .................................. 2015-038811

(51) Int. Cl.
*H01M 10/44* (2006.01)
*H01M 10/615* (2014.01)
(Continued)

(52) U.S. Cl.
CPC ..... *H01M 10/448* (2013.01); *H01M 10/0525* (2013.01); *H01M 10/425* (2013.01);
(Continued)

(58) Field of Classification Search
CPC .. H01M 10/448; H01M 10/425; H01M 10/44; H01M 10/6571; H01M 10/615;
(Continued)

(56) References Cited

U.S. PATENT DOCUMENTS 5,510,690 A 4/1996 Tanaka et al.
5,530,335 A 6/1996 Decker et al.
(Continued)

FOREIGN PATENT DOCUMENTS

JP 4-372532 A 12/1992
JP 7-46767 A 2/1995
(Continued)

OTHER PUBLICATIONS

International Search Report of PCT application No. PCT/JP2015/002679 dated Aug. 18, 2015.

*Primary Examiner* — M Baye Diao
(74) *Attorney, Agent, or Firm* — Greenblum & Bernstein, P.L.C.

(57) ABSTRACT

A battery pack includes a secondary battery, a circuit having a consumer consuming power of the battery, terminals charging or discharging the pack, a switch that, when the voltage of the battery reaches the discharge cutoff voltage, is opened to stop discharge of the battery through the terminals, and a controller performing a first discharge operation activating the circuit and causing the consumer to consume a remaining power of the battery until a voltage of the battery reaches a first threshold value, higher than the discharge cutoff voltage, and stopping, when the voltage of the battery reaches the first threshold value, the first discharge operation. The controller also performs a second discharge operation activating the circuit and causing the consumer to consume the remaining power of the battery
(Continued)

until the voltage of the battery reaches a third threshold value, lower than the discharge cutoff voltage.

17 Claims, 27 Drawing Sheets

Related U.S. Application Data continuation of application No. PCT/JP2015/002679, filed on May 27, 2015.

(51) Int. Cl.

| | | |
|---|---|---|
| *H01M 10/48* | (2006.01) | |
| *H02J 7/00* | (2006.01) | |
| *H01M 10/42* | (2006.01) | |
| *H01M 10/0525* | (2010.01) | |
| *H01M 10/6571* | (2014.01) | |
| *H01M 10/052* | (2010.01) | |
| *H01M 10/34* | (2006.01) | |

(52) U.S. Cl.
CPC ....... *H01M 10/4257* (2013.01); *H01M 10/44* (2013.01); *H01M 10/48* (2013.01); *H01M 10/615* (2015.04); *H01M 10/6571* (2015.04); *H02J 7/0029* (2013.01); *H01M 10/052* (2013.01); *H01M 10/345* (2013.01); *H01M 2010/4278* (2013.01); *H01M 2220/20* (2013.01); *H01M 2220/30* (2013.01); *H02J 7/0016* (2013.01); *H02J 7/0021* (2013.01); *H02J 2007/004* (2013.01); *H02J 2007/005* (2013.01); *Y02E 60/122* (2013.01); *Y02E 60/124* (2013.01)

(58) Field of Classification Search
CPC ............. H01M 10/4257; H01M 10/48; H01M 10/0525; H01M 10/052; H01M 2220/30; H01M 10/345; H01M 2010/4278; H02J 7/0029; H02J 2007/005; H02J 2007/004; H02J 7/0016; H02J 7/0021
USPC .......................................................... 320/134
See application file for complete search history.

(56) References Cited

U.S. PATENT DOCUMENTS

| | | | |
|---|---|---|---|
| 5,675,258 A * | 10/1997 | Kadouchi | G01R 31/3842 324/433 |
| 5,694,021 A * | 12/1997 | Morioka | G01R 31/3648 320/106 |
| 6,222,346 B1 | 4/2001 | Mori | |
| 6,624,635 B1 | 9/2003 | Lui | |
| 7,262,956 B2 | 8/2007 | Suzuki et al. | |
| 7,308,194 B2 | 12/2007 | Iizuka et al. | |
| 7,507,500 B2 | 3/2009 | Donnelly et al. | |
| 7,649,340 B2 | 1/2010 | Sato et al. | |
| 7,661,370 B2 | 2/2010 | Pike et al. | |
| 8,089,247 B2 * | 1/2012 | Pellenc | H02J 7/0042 320/112 |
| 8,203,305 B1 | 6/2012 | Wortham et al. | |
| 8,295,128 B2 | 10/2012 | Hasumi et al. | |
| 8,928,286 B2 | 1/2015 | Amiruddin et al. | |
| 8,981,710 B2 | 3/2015 | Hintz et al. | |
| 9,321,433 B2 | 4/2016 | Yin et al. | |
| 9,525,295 B2 | 12/2016 | Kern et al. | |
| 9,860,965 B2 | 1/2018 | Recker et al. | |
| 2002/0084998 A1 | 7/2002 | Sawada | |
| 2004/0113588 A1 | 6/2004 | Mikuriya et al. | |
| 2009/0140696 A1 | 6/2009 | Okuto | |
| 2010/0074059 A1 | 3/2010 | Hasumi et al. | |
| 2010/0114800 A1 | 5/2010 | Yasuda et al. | |
| 2010/0304206 A1 | 12/2010 | Nakashima et al. | |
| 2012/0126751 A1 | 5/2012 | Cassidy | |
| 2014/0117934 A1 | 5/2014 | Kurikuma et al. | |
| 2015/0109133 A1 | 4/2015 | Andre | |
| 2016/0268841 A1 | 9/2016 | Zeier et al. | |

FOREIGN PATENT DOCUMENTS

| | | |
|---|---|---|
| JP | 11-283592 A | 10/1999 |
| JP | 2003-70176 A | 3/2003 |
| JP | 2003-142162 A | 5/2003 |
| JP | 2004-319304 A | 11/2004 |
| JP | 2009-139361 A | 6/2009 |
| JP | 2010-108833 A | 5/2010 |
| JP | 2010-182579 A | 8/2010 |
| JP | 2010-251104 A | 11/2010 |
| JP | 2012-182890 A | 9/2012 |
| JP | 2014-50942 A | 3/2014 |
| WO | 2003-069715 A1 | 8/2003 |
| WO | 2009/025307 A1 | 2/2009 |
| WO | 2014/038165 A1 | 3/2014 |

\* cited by examiner

STORAGE BATTERY PACK AND METHOD OF OPERATING THE SAME

CROSS REFERENCE TO RELATED APPLICATIONS

This application is a continuation application of U.S. application Ser. No. 15/277,363, filed Sep. 27, 2016, which is a continuation of PCT/JP2015/002679, filed May 27, 2015, which claims the foreign priority benefit of JP 2015-038811, filed Feb. 27, 2015, and JP 2014-143622, filed Jul. 11, 2014. The entire disclosures of the above-identified applications are incorporated herein by reference in their entirety.

BACKGROUND

1. Technical Field

The present disclosure relates to a storage battery pack.

2. Description of the Related Art

A storage battery pack for supplying power to an electrical appliance is charged by a charging device.

The following technique has been proposed: when abnormality occurs in a battery pack including a secondary battery, the battery pack, in which abnormality occurs, is made unusable and internally connected to a dummy resistor so that the energy stored in the secondary battery is forced to discharge (see, for instance, Japanese Unexamined Patent Application Publication No. 2010-251104). Also, the following technique has been proposed: when abnormality occurs in a predetermined battery cell in an assembled battery in which secondary battery cells are connected in parallel, the battery cell is blocked from a charge/discharge circuit and is connected to a discharge circuit so that unnecessary capacity (electrical energy) of the battery cell is removed (see, for instance, Japanese Unexamined Patent Application Publication No. 2012-182890).

SUMMARY

However, in related art, safety has not been sufficiently studied.

One non-limiting and exemplary embodiment provides a storage battery pack that achieves improved safety compared with related art.

In one general aspect, the techniques disclosed here feature a storage battery pack including: a secondary battery; and a circuit that includes a power consumer which consumes power of the secondary battery, and that causes the power consumer to consume a remaining power of the secondary battery until a voltage of the secondary battery reaches a voltage lower than a discharge cutoff voltage.

A storage battery pack according to an aspect of the present disclosure has improved safety compared to related art.

It should be noted that general or specific embodiments may be implemented as a system, a method, an integrated circuit, a computer program, a storage medium such as a computer-readable CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
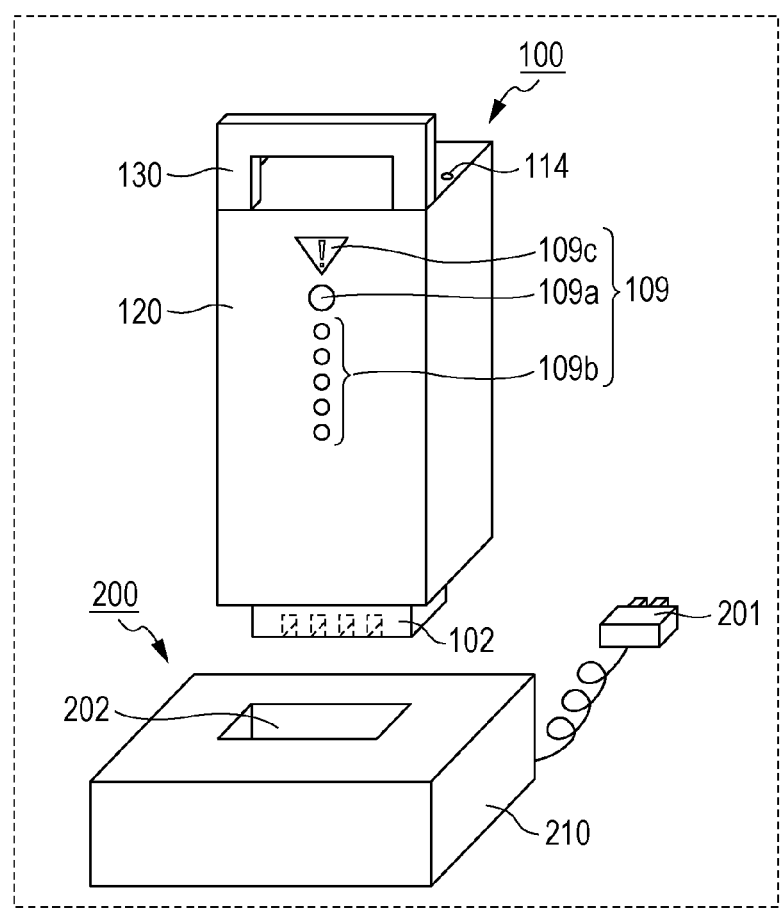
FIG. 1 is a perspective view of a storage battery pack separated from a charging device, according to a first embodiment.

In the above-mentioned storage battery pack in related art, it is disclosed that when abnormality occurs, the remaining power of the secondary battery is discharged. However, it has not been discussed to what extent of the discharge is appropriate.

In a secondary battery, when the voltage reaches a nominal value (discharge cutoff voltage), a protection circuit is normally activated and the discharge is stopped. When a secondary battery is discharged with a voltage lower than a discharge cutoff voltage, the performance of the second potential deteriorates, and thus, the secondary battery is protected by activating a protection circuit. The protection circuit includes a switching element, and when the protection circuit is activated, the switching element is opened (turned OFF).

As a result of intensive study, the inventor has obtained the following knowledge. Once a secondary battery is discharged until the voltage reaches a discharge cutoff voltage, even when the secondary battery is scrapped in a disposal process, the possibility of ignition and smoke from the secondary battery is reduced. However, even when the secondary battery is discharged until a discharge cutoff voltage is reached, the remaining capacity of the secondary battery is still left, and thus in some cases, a problem arises in that people who handles storage battery packs may have electric shock or suffer burns due to heat generation in a disposal process.

Thus, a first aspect of the present disclosure provides a storage battery pack including: a secondary battery; and a circuit that includes a power consumer which consumes power of the secondary battery, and that causes the power consumer to consume a remaining power of the secondary battery until a voltage of the secondary battery reaches a voltage lower than a discharge cutoff voltage.

Consequently, in contrast to related art, the possibility of occurrence of electric shock, burns of handlers of storage battery packs is reduced, and safety is improved.

Here, the above-mentioned voltage may be either one of the voltage itself and a physical quantity correlated with the voltage. Examples of a physical quantity correlated with the voltage include the capacity of the secondary battery, and the output current of the secondary battery.

A second aspect of the present disclosure may be the storage battery pack in the first aspect, further including a switching element that, when the voltage of the secondary battery reaches the discharge cutoff voltage, is opened to stop discharge of the secondary battery. The circuit does not include the switching element.

Consequently, even when the secondary battery has a lower voltage than a discharge cutoff voltage, the power of the secondary battery may be consumed by the power consumer.

A third aspect of the present disclosure may be the storage battery pack in the first aspect, further including a switching element that, when the voltage of the secondary battery reaches the discharge cutoff voltage, stops discharge of the secondary battery. The circuit branches from a circuit including the switching element, in an electric line upstream of the switching element with respect to the secondary battery.

Consequently, even when the secondary battery has a lower voltage than a discharge cutoff voltage, the power of the secondary battery may be consumed by the power consumer.

A fourth aspect of the present disclosure may be the storage battery pack in any one of the first to third aspects, further including a receiver that receives a command for activating the circuit from an external entity. When the receiver receives the command, the circuit causes the power consumer to consume the remaining power of the secondary battery.

Consequently, a command from an external entity allows to reduce the possibility of occurrence of electric shock, burns of handlers of storage battery packs. In addition, for instance, even at the occurrence of abnormality of the storage battery pack, when the command is executed by an external entity, consumption (hereinafter may be referred to as remaining power consumption) of the remaining power of the secondary battery is made by the power consumer, and when the command is not executed, the remaining power consumption is not made. That is, for instance, when abnormality occurs in the storage battery pack, the above-mentioned remaining power consumption is made appropriately as needed. In other words, for instance, when abnormality occurs in the storage battery pack, it is possible to reduce the possibility of making remaining power consumption although the consumption is unnecessary.

Here, the external entity may be in any form as long as a command for activating the circuit is executable via the external entity, and includes, for instance, users of storage battery packs, a collection contractor for storage battery packs, a server system, and an information terminal.

A fifth aspect of the present disclosure may be the storage battery pack in the fourth aspect, further including a controller that, when the receiver receives the command from the external entity, activates the circuit and causes the power consumer to consume the remaining power of the secondary battery.

Consequently, a command from an external entity allows to reduce the possibility of occurrence of electric shock, burns of handlers of storage battery packs. In addition, for instance, even when abnormality occurs in the storage battery pack, the remaining power of the secondary battery is consumed by the power consumer appropriately as needed.

A sixth aspect of the present disclosure may be the storage battery pack in the fourth aspect, in which the receiver is a mechanical switch that is operated by an operator, and when an operator operates the mechanical switch to activate the circuit, the circuit is activated and causes the power consumer to consume the remaining power of the secondary battery.

Consequently, an operation of the mechanical switch by an operator allows to reduce the possibility of occurrence of electric shock, burns of handlers of storage battery packs. In addition, for instance, even when abnormality occurs in the storage battery pack, the remaining power of the secondary battery is consumed by the power consumer appropriately as needed.

A seventh aspect of the present disclosure may be the storage battery pack in the fifth aspect, in which the receiver is a switch that is operated by an operator, and when an operator operates the switch to activate the circuit, the controller activates the circuit and causes the power consumer to consume the remaining power of the secondary battery.

Consequently, an operation of the switch by an operator allows to reduce the possibility of occurrence of electric shock, burns of handlers. In addition, for instance, even when abnormality occurs in the storage battery pack, the remaining power of the secondary battery is consumed by the power consumer appropriately as needed.

An eighth aspect of the present disclosure may be the storage battery pack in the fifth aspect, in which the receiver is a receiving unit that receives the command from an external entity via wireless communication, and the controller, upon receiving the command via the receiving unit, activates the circuit and causes the power consumer to consume the remaining power of the secondary battery.

Consequently, a command from an external entity via wireless communication allows to reduce the possibility of occurrence of electric shock, burns of handlers of storage battery packs. In addition, for instance, even when abnormality occurs in the storage battery pack, the remaining power of the secondary battery is consumed by the power consumer appropriately as needed.

A ninth aspect of the present disclosure may be the storage battery pack in any one of the fourth to eighth aspects, further including a notifier that, when the receiver receives the command from an external entity, notifies that the secondary battery is scheduled to be discarded.

When the command is issued by the receiver, the remaining power of the secondary battery is consumed by the power consumer, and normally, the storage battery pack is subsequently discarded.

Thus, in contrast to the case where it is notified that a storage battery pack is scheduled to be discarded, for instance, due to an occurrence of abnormality in the storage battery pack, when a user of the storage battery pack has an intention to discard the storage battery pack, it is notified that the storage battery pack is scheduled to be discarded. In short, it is possible to reduce the occurrence of the case where it is notified that a storage battery pack is scheduled to be discarded although a user of the storage battery pack has no intention of discarding the storage battery pack.

A tenth aspect of the present disclosure may be the storage battery pack in any one of the first to eighth aspects, further including a notifier that, when consumption of the remaining power of the secondary battery by the power consumer is completed, notifies that the secondary battery is scheduled to be discarded.

When consumption of the remaining power of the secondary battery is completed by the power consumer, normally, the storage battery pack is subsequently discarded.

Consequently, this reduces the occurrence of a case where it is notified that a storage battery pack is scheduled to be discarded although a user of the storage battery pack has no intention of discarding the storage battery pack.

An eleventh aspect of the present disclosure may be the storage battery pack in any one of the fourth to eighth aspects, further including a notifier that, when the receiver receives a command from an external entity, notifies an information terminal of information to prompt contact with a collection contractor of the secondary battery.

When the command is issued by the receiver, the remaining power of the secondary battery is consumed by the power consumer, and normally, the storage battery pack is subsequently discarded.

Consequently, in contrast to the case where a user is notified of information to prompt contact with a collection contractor, for instance, at the occurrence of abnormality in the storage battery pack, a mobile terminal is notified of the information when the storage battery pack is more likely to be discarded. In short, it is possible to reduce the occurrence of the case where an information terminal is notified of information to prompt contact with a collection contractor although a user of the storage battery pack has no intention of discarding the storage battery pack.

A twelfth aspect of the present disclosure may be the storage battery pack in any one of the first to eighth aspects, further including a notifier that, when consumption of the remaining power of the secondary battery by the power consumer is completed, notifies an information terminal of information to prompt contact with a collection contractor of the secondary battery.

When consumption of the remaining power of the secondary battery is completed by the power consumer, normally, the storage battery pack is subsequently discarded.

Therefore, it is possible to reduce the occurrence of the case where an information terminal is notified of information to prompt contact with a collection contractor although a user of the storage battery pack has no intention of discarding the storage battery pack.

A thirteenth aspect of the present disclosure may be the storage battery pack in any one of the first to twelfth aspects, further including a notifier that notifies that the remaining power of the secondary battery is being consumed by the power consumer.

Thus, it is possible to recognize that the remaining power of the storage battery pack is consumed by the power consumer.

A fourteenth aspect of the present disclosure may be the storage battery pack in any one of the first to thirteenth aspects, further including a notifier that notifies that consumption of the remaining power of the secondary battery by the power consumer is completed.

Thus, it is possible to recognize that consumption of the remaining power of the secondary battery by the power consumer is completed.

A fifteenth aspect of the present disclosure may be the storage battery pack in any one of the first to third, tenth, twelfth to fourteenth aspects, further including a controller that, when the storage battery pack is abnormal, activates the circuit and causes the power consumer to consume the remaining power of the secondary battery.

Thus, when the storage battery pack is abnormal, consumption of the remaining power of the secondary battery is automatically made by the power consumer, and in contrast to related art, it is possible to reduce the possibility of occurrence of electric shock, burns of handlers of storage battery packs.

A sixteenth aspect of the present disclosure may be the storage battery pack in any one of the fifth, seventh, eighth, and fifteenth aspects, in which the controller deactivates the circuit in a state where a capacity is left that allows the controller to be operative, and completes consumption of the remaining power of the secondary battery by the power consumer.

Thus, after the consumption of the remaining power of the secondary battery by the power consumer is completed, an operation is operative via the controller. The above-mentioned operation is set as needed and may be an operation of transmitting a state information on the storage battery pack to an external entity, for instance, via the communicator provided in the storage battery pack. Here, the state information on the storage battery pack is information that indicates a state of the storage battery pack, and examples thereof include, for instance, the voltage, remaining capacity of the secondary battery, but the state information is not limited to these examples. Also, examples of the external entity include a server system that holds the information on the storage battery pack, and the information terminal of a user of the storage battery pack.

A seventeenth aspect of the present disclosure may be the storage battery pack in any one of the fifth, seventh, eighth, fifteenth, and sixteenth aspects, further including a communicator that allows communication with an external device. The controller, when completing consumption of the remaining power of the secondary battery by the power consumer, transmits information indicating a remaining capacity of the secondary battery to the external device via the communicator.

Thus, it is possible to recognize the remaining capacity of the secondary battery when consumption of the remaining power of the secondary battery by the power consumer is completed. Therefore, it is possible to recognize whether or not consumption of the remaining power of the secondary battery has been made reliably.

Here, the information indicating the remaining capacity of the secondary battery may be either one of the remaining capacity itself and a physical quantity correlated with the remaining capacity. Examples of a physical quantity correlated with the remaining capacity include the voltage, output current of the secondary battery.

An eighteenth aspect of the present disclosure may be the storage battery pack in any one of the fifth, seventh, eighth, fifteenth, and sixteenth aspects, further including a communicator that allows communication with an external device. The controller, after completing consumption of the remaining power of the secondary battery by the power consumer, transmits information indicating a remaining capacity of the secondary battery to the external device via the communicator.

Thus, it is possible to recognize the remaining capacity of the secondary battery when consumption of the remaining power of the secondary battery by the power consumer is completed. Therefore, it is possible to recognize whether or not consumption of the remaining power of the secondary battery has been made reliably.

Here, the information indicating the remaining capacity of the secondary battery may be either one of the remaining capacity itself and a physical quantity correlated with the remaining capacity. Examples of a physical quantity correlated with the remaining capacity include the voltage, output current of the secondary battery.

A nineteenth aspect of the present disclosure may be the storage battery pack in any one of the fifth, seventh, eighth, and fifteenth aspects, in which the secondary battery includes a plurality of cells, and the controller deactivates the circuit before voltages of all the cells reach 0 V, and completes consumption of the remaining power of the secondary battery by the power consumer.

When the secondary battery includes cells, it is preferable that the cells have an uniform state of health (SOH). However, the cells exhibit different SOHs as the storage battery pack is used more often. It is to be noted that SOH is an index that indicates a degree of deterioration of the secondary battery, and is, for instance, a ratio of the current full charge capacity with respect to the full charge capacity of the secondary battery when not in use. Here, when the remaining power of the secondary battery is consumed, the voltages of the cells are varied, and in some cells, the remaining capacities reach 0, i.e., the voltages reach 0 V relatively early. When those cells with the reached 0 V are further discharged, polarity inversion occurs, and there arises a problem in safety.

Thus, consumption of the power of the secondary battery by the power consumer is terminated before the voltages of all cells reaches 0 V, and the number of cells in which polarity inversion occurs is thereby reduced compared with the case where the secondary battery is discharged until the voltages of all cells reaches 0 V, and thus safety is improved.

A twentieth aspect of the present disclosure may be the storage battery pack in the nineteenth aspect, in which when a voltage of at least one of the cells reaches 0 V, the controller deactivates the circuit.

Thus, the number of cells, in which polarity inversion occurs due to the consumption of the remaining power of the secondary battery, is reduced, and thus safety is improved.

A 21st aspect of the present disclosure may be the storage battery pack in any one of the fifth, seventh, eighth, and fifteenth to twentieth aspects, further including a connector that is connected to an electrical appliance in a freely detachable manner. The controller causes not only the power consumer but also the electrical appliance to consume the remaining power of the secondary battery via the connector until a voltage of the secondary battery reaches a discharge cutoff voltage.

Thus, it is possible to consume the remaining power of the secondary battery more quickly.

A 22nd aspect of the present disclosure may be the storage battery pack in any one of the fifth, seventh, eighth, and fifteenth to twentieth aspects, further including a connector that is connected to a charging device to charge the secondary battery in a freely detachable manner. Upon detecting start of charge of the secondary battery in a state where the connector is connected to the charging device, the controller causes the power consumer to consume the remaining power of the secondary battery until a value indicating a remaining capacity of the secondary battery reaches a threshold value or less for determining whether or not continuous use of the secondary battery is allowed.

In this manner, the above-mentioned discharge is performed at the time charge, and a user does not have to discharge the secondary battery separately to determine whether or not continuous use is allowed. Also, since the secondary battery is discharged at the time of charge when the amount of stored power is estimated to be low, the time taken for the discharge may be reduced.

Since the secondary battery is discharged at the appropriate timing as described above, the time, in which the storage battery pack is available to a user for power supply to an electrical appliance, is likely to be secured, and thus the convenience of the storage battery pack is improved.

Here, the value indicating the remaining capacity of the secondary battery may be either one of the remaining capacity itself and a physical quantity correlated with the remaining capacity. Examples of a physical quantity correlated with the remaining capacity include the voltage of the secondary battery, the output current of the secondary battery.

A 23rd aspect of the present disclosure may be the storage battery pack in any one of the first to 22nd aspects, in which the secondary battery includes a plurality of cells, and the power consumer includes a resistor for cell balance for adjusting a voltage between the cells.

Like this, a resistor for cell balance may be used for discharge of the secondary battery.

A 24th aspect of the present disclosure may be the storage battery pack in any one of the first to 23rd aspects, in which the power consumer is a heating element that generates heat by consuming power discharged by the secondary battery.

Thus, it is possible to heat the storage battery pack using the power consumer.

A 25th aspect of the present disclosure may be the storage battery pack in the 24th aspect, in which the heating element surrounds a periphery of the secondary battery.

Thus, it is possible to heat the periphery of the secondary battery using the power consumer.

A 26th aspect of the present disclosure may be the storage battery pack in the 24th or 25th aspect, in which upon decrease of a temperature inside the storage battery pack, the controller activates the circuit and heats the secondary battery by the power consumer.

Thus, reduction of the temperature of the storage battery pack is lessened, and the occurrence frequency of an operational failure due to a low temperature of the secondary battery is reduced.

A 27th aspect of the present disclosure may be the storage battery pack in the 22nd aspect, in which the controller performs the discharge when the value indicating the remaining capacity of the secondary battery is greater than the first threshold value and less than or equal to a second threshold value which is less than a value indicating full charge.

Thus, since the above-mentioned discharge is performed when the remaining capacity of the secondary battery is less than the full charge capacity, the secondary battery may be discharged in a shorter time compared with the case where the above-mentioned discharge is performed at the time of full charge.

A 28th aspect of the present disclosure may be the storage battery pack in the 22nd aspect, further including a storage that stores a history of the discharge, and in the storage battery pack, the controller performs subsequent discharge after lapse of a predetermined period.

Thus, discharge of the secondary battery is performed not for every charge of the secondary battery but performed under a necessary condition for elapse of a predetermined period. Therefore, unnecessary discharge may be reduced in a situation where the time interval between charges is short and a variation of the battery life is estimated to be low depending on setting of a predetermined period. Furthermore, it is possible to suppress deterioration (reduction in the life) of the secondary battery by reducing the number of times of discharge. The predetermined period is set to be longer than the time interval in which charge is performed.

A 29th aspect of the present disclosure may be the storage battery pack in any one of the 22nd, 27th and 28th aspects, in which the controller further determines whether or not continuous use of the secondary battery is allowed, based on the amount of discharge of the secondary battery, the discharge causing the value indicating the remaining capacity of the secondary battery to change from the value indicating full charge to the first threshold value or less.

A 30th aspect of the present disclosure may be the storage battery pack in any one of the 22nd, 27th and 28th aspects, further including a communicator that communicates with an external device, and the communicator transmits to the external device an amount of discharge causing the value indicating the remaining capacity of the secondary battery to change from the value indicating full charge to the first threshold value or less, and receives from the external device information indicating whether or not continuous use of the secondary battery is allowed.

Like this, whether or not continuous use of the secondary battery after discharge is allowed may be determined by the storage battery pack, or may be determined by an external device (for instance, a charging device, a server system, an information terminal).

A 31st aspect of the present disclosure may be the storage battery pack in any one of the 22nd, 27th to 30th aspects, further including a displayer that displays at least one of information indicating the discharge is in operation and information indicating whether or not continuous use of the secondary battery is allowed.

This makes it possible to check a state of the secondary battery by the storage battery pack alone.

A 32nd aspect of the present disclosure may be the storage battery pack in any one of the 22nd, 27th and 28th aspects, further including a communicator that communicates with an external device, and the controller transmits at least one of information indicating the discharge is in operation and information indicating whether or not continuous use of the secondary battery is allowed to the external device via the communicator.

This allows recognition of a state of the secondary battery via the external device. Here, examples of the external device include a charging device, a server system, and an information terminal.

A 33rd aspect of the present disclosure may be the storage battery pack in any one of the 22nd, 27th to 32nd aspects, in which when it is determined that continuous use of the secondary battery is not allowed, the controller discharges the secondary battery using the power consumer until the value indicating the remaining capacity of the secondary battery falls below a third threshold value which is less than the first threshold value.

In this manner, the secondary battery, for which it is determined that continuous use is not allowed, is further discharged, thereby making it possible to reduce the dangerous possibility such as ignition, smoke. Therefore, it is possible to improve the safety in discarding the storage battery pack.

Here, the third threshold value may be a value that indicates the remaining capacity of the secondary battery when the voltage is lower than a discharge cutoff voltage.

After the discharge, it is possible to reduce the possibility of occurrence of electric shock, burns of handlers of storage battery packs.

A 34th aspect of the present disclosure may be the storage battery pack in any one of the 22nd, 27th to 33rd aspects, further including an abnormality detector that detects abnormality of the storage battery pack, and when the abnormality detector detects abnormality of the storage battery pack, the controller discharges the secondary battery using the power consumer until the value indicating the remaining capacity of the secondary battery falls below a third threshold value which is less than the first threshold value.

Thus, when abnormality of the storage battery pack is detected, the secondary battery is further discharged, thereby making it possible to reduce the dangerous possibility such as ignition, smoke. Therefore, it is possible to improve the safety in discarding the storage battery pack in which abnormality is detected.

A 35th aspect of the present disclosure may be the storage battery pack in the 34th aspect, further including a displayer that upon detection of abnormality of the storage battery pack by the abnormality detector, displays information indicating the abnormality.

Thus, when abnormality occurs in the secondary battery, the storage battery pack alone is able to notify an external entity of the abnormality.

A 36th aspect of the present disclosure may be the storage battery pack in the 34th aspect, further including a communicator that communicates with a charging device, and when the abnormality detector detects abnormality of the storage battery pack, the controller transmits information indicating the abnormality to the charging device via the communicator.

Thus, it is possible to detect an occurrence of abnormality of the storage battery pack on the charging device side.

A 37th aspect of the present disclosure may be the storage battery pack in any one of the 22nd, 27th to 36th aspects, further including a current measure that measures a current which flows from the secondary battery to an electrical appliance connected to the connector, and a current which flows from the secondary battery to the power consumer, and the current measure is provided between the secondary battery and the power consumer.

Thus, it is possible to check a current value of the secondary battery when it is discharged, using the power consumer.

Here, the above-mentioned electrical appliance is, for instance, a charging device that charges the storage battery pack. The remaining power of the secondary battery may be consumed by a load in the charging device.

A 38th aspect of the present disclosure may be the storage battery pack in the 22nd aspect, in which the controller causes not only the power consumer but also the electrical appliance connected to the connector to consume the power of the secondary battery.

Thus, it is possible to determine more quickly whether or not continuous use of the secondary battery is allowed.

Here, the above-mentioned electrical appliance is, for instance, a charging device that charges the storage battery pack. The remaining power of the secondary battery may be consumed by a load in the charging device.

A 39th aspect of the present disclosure may be the storage battery pack in any one of the fifth, seventh, fifteenth to 38th aspects, further including a switcher that switches between presence and absence of electrical connection of the secondary battery and the power consumer, and the controller performs the discharge by controlling the switcher to electrically connect the secondary battery and the power consumer.

Like this, specifically, the above-mentioned discharge is performed, for instance, based on the control of a switcher.

In addition, a 40th aspect of the present disclosure provides a method of operating a storage battery pack, the method including: a step (a) of activating a circuit including the power consumer; and a step (b) of then consuming the remaining power of the secondary battery by the power consumer in the activated circuit until the voltage of the secondary battery reaches a voltage lower than a discharge cutoff voltage.

Consequently, in contrast to related art, the possibility of occurrence of electric shock, burns of handlers of storage battery packs is reduced, and safety is improved.

A 41st aspect of the present disclosure provides the method of operating a storage battery pack in the 40th aspect, the storage battery pack including a switching element that is opened to stop discharge of the secondary battery when the voltage of the secondary battery reaches the discharge cutoff voltage, the circuit not including the switching element.

Consequently, even when the secondary battery has a lower voltage than the discharge cutoff voltage, the power of the secondary battery may be consumed by the power consumer.

A 42nd aspect of the present disclosure provides the method of operating a storage battery pack in the 40th aspect, the storage battery pack including a switching element that stops discharge of the secondary battery when the voltage of the secondary battery reaches the discharge cutoff voltage. The circuit branches from a circuit including the switching element, in an electric line upstream of the switching element with respect to the secondary battery.

Consequently, even when the secondary battery has a lower voltage than a discharge cutoff voltage, the power of the secondary battery may be consumed by the power consumer.

A 43rd aspect of the present disclosure may be the method of operating a storage battery pack in the 40th aspect, including a step (c) of receiving a command from an external entity to activate the circuit, and when the command is received, the step (a) is performed.

Consequently, a command from an external entity allows to reduce the possibility of occurrence of electric shock, burns of handlers of storage battery packs. In addition, for instance, even at the occurrence of abnormality of the storage battery pack, when the command is executed by an external entity, consumption (hereinafter may be referred to as remaining power consumption) of the remaining power of the secondary battery is made by the power consumer, and when the command is not executed, the remaining power consumption is not made. That is, for instance, when abnormality occurs in the storage battery pack, the above-mentioned remaining power consumption is made appropriately as needed. In other words, for instance, when abnormality occurs in the storage battery pack, it is possible to reduce the possibility of making remaining power consumption although the consumption is unnecessary.

A 44th aspect of the present disclosure may be the method of operating a storage battery pack in the 43rd aspect, in which when the command is received, the controller activates the circuit and causes the circuit to consume the remaining power of the secondary battery in the step (a).

Consequently, a command from an external entity allows to reduce the possibility of occurrence of electric shock, burns of handlers of storage battery packs. In addition, for instance, even when abnormality occurs in the storage battery pack, the remaining power of the secondary battery is consumed by the power consumer appropriately as needed.

A 45th aspect of the present disclosure may be the method of operating a storage battery pack in the 43rd aspect, in which the step (c) is a step of receiving an operation to activate the circuit by an operator for a mechanical switch provided in the storage battery pack.

Consequently, an operation of the mechanical switch by an operator allows to reduce the possibility of occurrence of electric shock, burns of handlers of storage battery packs. In addition, for instance, even when abnormality occurs in the storage battery pack, the remaining power of the secondary battery is consumed by the power consumer appropriately as needed.

A 46th aspect of the present disclosure may be the method of operating a storage battery pack in the 44th aspect, in which the step (c) is a step of receiving an operation to activate the circuit by an operator for a switch provided in the storage battery pack.

Consequently, an operation of the switch by an operator allows to reduce the possibility of occurrence of electric shock, burns of handlers of storage battery packs. In addition, for instance, even when abnormality occurs in the storage battery pack, the remaining power of the secondary battery is consumed by the power consumer appropriately as needed.

A 47th aspect of the present disclosure may be the method of operating a storage battery pack in the 44th aspect, in which the step (c) is a step of receiving the command from an external entity via wireless communication.

Consequently, a command from an external entity via wireless communication allows to reduce the possibility of occurrence of electric shock, burns of handlers of storage battery packs. In addition, for instance, even when abnormality occurs in the storage battery pack, the remaining power of the secondary battery is consumed by the power consumer appropriately as needed.

A 48th aspect of the present disclosure may be the method of operating a storage battery pack in any one of the 43rd to 47th aspects, further including a step (d3) of, upon receiving the command from an external entity by the receiver, notifying that the secondary battery is scheduled to be discarded.

When the command is issued, the remaining power of the secondary battery is consumed by the power consumer, and normally, the storage battery pack is subsequently discarded.

Thus, in contrast to the case where it is notified that a storage battery pack is scheduled to be discarded, for instance, due to an occurrence of abnormality in the storage battery pack, when a user of the storage battery pack has an intention to discard the storage battery pack, it is notified that the storage battery pack is scheduled to be discarded. In short, for instance, when abnormality occurs in the storage battery pack, it is possible to reduce the occurrence of the case where it is notified that a storage battery pack is scheduled to be discarded although a user of the storage battery pack has no intention of discarding the storage battery pack.

A 49th aspect of the present disclosure may be the method of operating a storage battery pack in any one of the 40th to 47th aspects, further including a step (d4) of, upon completion of the consumption of the power of the secondary battery by the power consumer, notifying that the secondary battery is scheduled to be discarded.

When consumption of the remaining power of the secondary battery is made by the power consumer, normally, the storage battery pack is subsequently discarded.

Consequently, this reduces the occurrence of a case where it is notified that a storage battery pack is scheduled to be discarded although a user of the storage battery pack has no intention of discarding the storage battery pack.

A 50th aspect of the present disclosure may be the method of operating a storage battery pack in any one of the 43rd to 47th aspects, further including a step (d5) of, upon receiving a command by the receiver from an external entity, notifying an information terminal of information to prompt contact with a collection contractor of the secondary battery.

When the command is issued, the remaining power of the secondary battery is consumed by the power consumer, and normally, the storage battery pack is subsequently discarded.

Consequently, in contrast to the case where a user is notified of information to prompt contact with a collection contractor, for instance, at the occurrence of abnormality in the storage battery pack, an information terminal is notified of the information when the storage battery pack is more likely to be discarded. In short, it is possible to reduce the occurrence of the case where an information terminal is notified of information to prompt contact with a collection contractor although a user of the storage battery pack has no intention of discarding the storage battery pack.

A 51st aspect of the present disclosure may be the method of operating a storage battery pack in any one of the 40th to 47th aspects, further including a step (d6) of, upon completion of the consumption of the power of the secondary battery by the power consumer, notifying an information terminal of information to prompt contact with a collection contractor of the secondary battery.

When consumption of the remaining power of the secondary battery is made by the power consumer, normally, the storage battery pack is subsequently discarded.

Therefore, it is possible to reduce the occurrence of the case where an information terminal is notified of information to prompt contact with a collection contractor although a user of the storage battery pack has no intention of discarding the storage battery pack.

A 52nd aspect of the present disclosure may be the method of operating a storage battery pack in any one of the 40th to 51st aspects, further including a step (d1) of notifying that the remaining power of the secondary battery is being consumed by the power consumer.

Thus, it is possible to recognize that the remaining power of the storage battery pack is consumed by the power consumer.

A 53rd aspect of the present disclosure may be the method of operating a storage battery pack in any one of the 40th to 52nd aspects, further including a step (d2) of notifying that consumption of the remaining power of the secondary battery by the power consumer is completed.

Thus, it is possible to recognize that consumption of the remaining power of the secondary battery by the power consumer is completed.

A 54th aspect of the present disclosure may be the method of operating a storage battery pack in any one of the 40th, 49th, 51st to 53rd aspects, in which when the storage battery pack is abnormal, the step (a) is performed.

Thus, when the storage battery pack is abnormal, consumption of the remaining power of the secondary battery is made by the power consumer, and in contrast to related art, it is possible to reduce the possibility of occurrence of electric shock, burns of handlers of storage battery packs.

A 55th aspect of the present disclosure may be the method of operating a storage battery pack in any one of the 44th, 46th, 47th, and 54th aspects, further including a step (e) of terminating the consumption of the remaining power of the secondary battery by the power consumer in a state where a capacity is left that allows the secondary battery itself to be operative.

Thus, even after the consumption of the remaining power of the secondary battery by the power consumer is completed, the storage battery pack is operative. The above-mentioned operation is set as needed and may be an operation of transmitting a state information on the storage battery pack to an external entity, for instance, via the communicator provided in the storage battery pack. Here, the state information on the storage battery pack is information that indicates a state of the storage battery pack, and examples thereof include, for instance, the voltage, remaining capacity of the secondary battery, but the state information is not limited to these. Also, examples of the external entity include a server system that holds the information on the storage battery pack, and the information terminal of a user of the storage battery pack.

A 56th aspect of the present disclosure may be the method of operating a storage battery pack in any one of the 44th, 46th, 47th, 54th and 55th aspects, further including a step (f1) of, upon completion of consumption of the remaining power of the secondary battery by the power consumer, transmitting information indicating the remaining capacity of the secondary battery to an external device via the communicator provided in the storage battery pack.

Thus, it is possible to recognize the remaining capacity of the secondary battery when the consumption of the remaining power of the secondary battery by the power consumer is completed. Therefore, it is possible to recognize whether or not consumption of the remaining power of the secondary battery has been made reliably.

A 57th aspect of the present disclosure may be the method of operating a storage battery pack in any one of the 44th, 46th, 47th, 54th and 55th aspects, further including a step (f2) of, after completion of consumption of the remaining power of the secondary battery by the power consumer, transmitting information indicating the remaining capacity of the secondary battery to an external device via the communicator provided in the storage battery pack.

Thus, it is possible to recognize the remaining capacity of the secondary battery after the consumption of the remaining power of the secondary battery by the power consumer is completed. Therefore, it is possible to recognize whether or not consumption of the remaining power of the secondary battery has been made reliably.

A 58th aspect of the present disclosure may be the method of operating a storage battery pack in any one of the 44th, 46th, 47th, and 54th aspects, further including a step (g) of terminating the consumption of the remaining power of the secondary battery including cells by the power consumer before the voltages of all the cells reach 0 V.

When the secondary battery includes cells, it is preferable that the cells have an uniform degree of deterioration (SOH). However, the cells exhibit different degrees of deterioration as the storage battery pack is used more often. Here, when the remaining power of the secondary battery is consumed, the voltages of the cells are varied, and in some cells, the voltages reach 0 V relatively early. When those cells with the reached 0 V are further discharged, polarity inversion occurs, and there arises a problem in safety.

Thus, consumption of the power of the secondary battery by the power consumer is terminated before the voltages of all cells reaches 0 V, and the number of cells in which polarity inversion occurs is thereby reduced compared with the case where the secondary battery is discharged until the voltages of all cells reaches 0 V, and thus safety is improved.

A 59th aspect of the present disclosure may be the method of operating a storage battery pack in the 58th aspect, in which in the step (g), when the voltage of at least one of the cells reaches 0 V, the consumption of the remaining power of the secondary battery by the power consumer is completed.

Thus, the number of cells, in which polarity inversion occurs due to the consumption of the remaining power of the secondary battery, is reduced, and thus safety is improved.

A 60th aspect of the present disclosure may be the method of operating a storage battery pack in any one of the 44th, 46th, 47th, and 54th to 59th aspects, in which the stored power is supplied to the electrical appliance via a connector that electrically connects the storage battery pack and the electrical appliance until the voltage of the secondary battery reaches a discharge cutoff voltage in the step (b), thereby causing not only the power consumer but also the electrical appliance to consume the remaining power of the secondary battery.

A 61st aspect of the present disclosure may be the method of operating a storage battery pack in any one of the 44th, 46th, 47th, and 54th to 59th aspects, further including a step (h), upon detecting the start of charge of the secondary battery in a state where a connector is connected to a charging device, the connector being connected to the charging device in a freely detachable manner to charge the secondary battery, discharging the secondary battery using the power consumer until the value indicating the remaining capacity of the secondary battery reaches the first threshold value or less for determining whether or not continuous use of the secondary battery is allowed.

In this manner, the above-mentioned discharge is performed at the time charge, and a user does not have to discharge the secondary battery separately to determine whether or not continuous use is allowed. Also, since the secondary battery is discharged at the time of charge when the amount of stored power is estimated to be low, the time taken for the discharge may be reduced.

Since the secondary battery is discharged at the appropriate timing as described above, the time, in which the storage battery pack is available to a user for power supply to an appliance, is secured, and thus the convenience of the storage battery pack may be improved.

A 62nd aspect of the present disclosure may be the method of operating a storage battery pack in any one of the 40th to 61st aspects, in which the secondary battery includes cells, and the power consumer includes a resistor for cell balance for adjusting the voltages between the cells.

Like this, a resistor for cell balance may be used for discharge of the secondary battery.

A 63rd aspect of the present disclosure may be the method of operating a storage battery pack in any one of the 40th to 62nd aspects, in which the power consumer is a heating element that generates heat by consuming the power discharged by the secondary battery.

Thus, it is possible to heat the storage battery pack using the power consumer.

A 64th aspect of the present disclosure may be the method of operating a storage battery pack in the 63rd aspect, in which the heating element surrounds the periphery of the secondary battery.

Thus, it is possible to heat the periphery of the secondary battery using the power consumer.

A 65th aspect of the present disclosure may be the method of operating a storage battery pack in the 63rd or 64th aspect, further including a step (i) of, upon decrease of the temperature inside the storage battery pack, activating the circuit and heating the secondary battery by the power consumer.

Thus, reduction of the temperature of the storage battery pack is lessened, and the occurrence frequency of an operational failure due to a low temperature of the secondary battery is reduced.

A 66th aspect of the present disclosure may be the method of operating a storage battery pack in the 61st aspect, in which in the step (i), when the remaining capacity of the secondary battery is greater than the first threshold value and less than or equal to a second threshold value which is less than a value indicating full charge, discharge is performed.

Thus, since the above-mentioned discharge is performed when the remaining capacity of the secondary battery is less than the full charge capacity, the secondary battery may be discharged in a shorter time compared with the case where the above-mentioned discharge is performed at the time of full charge.

A 67th aspect of the present disclosure may be the method of operating a storage battery pack in the 61st aspect, further including a step (j) of storing a history of the discharge and a step (k) of performing subsequent discharge after lapse of a predetermined period.

Thus, discharge of the secondary battery is performed not for every charge of the secondary battery but performed under a necessary condition for elapse of a predetermined period. Therefore, unnecessary discharge may be reduced in a situation where the time interval between charges is short and a variation of the battery life is estimated to be low. Furthermore, it is possible to suppress deterioration (reduction in the life) of the secondary battery by reducing the number of times of discharge. The predetermined period is set to be longer than the time interval in which charge is performed.

A 68th aspect of the present disclosure may be the method of operating a storage battery pack in any one of the 61st, 66th and 67th aspects, further including a step (I) of determining whether or not continuous use of the secondary battery is allowed, based on the amount of discharge of the secondary battery, the discharge causing the remaining capacity of the secondary battery to change from the value indicating full charge to the first threshold value or less.

A 69th aspect of the present disclosure may be the method of operating a storage battery pack in any one of the 61st, 66th and 67th aspects, further including: a step (m) of transmitting via a communicator provided in the storage battery pack to the external device an amount of discharge causing the value indicating the remaining capacity of the secondary battery to change from the value indicating full charge to the first threshold value or less; and a step (n) of receiving from the external device information indicating whether or not continuous use of the secondary battery is allowed.

Like this, whether or not continuous use of the secondary battery after discharge is allowed may be determined by the storage battery pack, or may be determined by an external device (for instance, a charging device, a server system, an information terminal).

A 70th aspect of the present disclosure may be the method of operating a storage battery pack in any one of the 61st, 46th to 69th aspects, further including a step (o) of displaying at least one of information indicating the discharge is in operation and information indicating whether or not continuous use of the secondary battery is allowed.

This makes it possible to check a state of the secondary battery by the storage battery pack alone.

A 71st aspect of the present disclosure may be the method of operating a storage battery pack in any one of the 61st, 66th and 67th aspects, further including a step (p) of transmitting via a communicator provided in the storage battery pack to the external device at least one of information indicating the discharge is in operation and information indicating whether or not continuous use of the secondary battery is allowed.

This allows recognition of a state of the secondary battery via the external device. Here, examples of the external device include a charging device, a server system, and an information terminal.

A 72nd aspect of the present disclosure may be the method of operating a storage battery pack in any one of the 61st, 66th and 71th aspects, further including a step (q) of, upon determination that continuous use of the secondary battery is not allowed, discharging the secondary battery using the power consumer until the remaining capacity of the secondary battery falls below a third threshold value which is less than the first threshold value.

In this manner, the secondary battery, for which it is determined that continuous use is not allowed, is further discharged, thereby making it possible to reduce the dangerous possibility such as ignition, smoke. Therefore, it is possible to improve the safety in discarding the storage battery pack.

Here, the third threshold value may be a value that indicates the remaining capacity of the secondary battery when the voltage is lower than a discharge cutoff voltage.

After the discharge, it is possible to reduce the possibility of occurrence of electric shock, burns of handlers of storage battery packs.

A 73rd aspect of the present disclosure may be the method of operating a storage battery pack in any one of the 61st, 66th to 72nd aspects, further including a step (r) of, in an abnormal condition of the storage battery pack, discharging the secondary battery using the power consumer until the value indicating the remaining capacity of the secondary battery falls below a third threshold value which is less than the first threshold value.

Thus, when the storage battery pack is abnormal, the secondary battery is further discharged, thereby making it possible to reduce the dangerous possibility such as ignition, smoke. Therefore, it is possible to improve the safety in discarding the storage battery pack.

Here, the third threshold value may be a value that indicates the remaining capacity of the secondary battery when the voltage is lower than a discharge cutoff voltage.

After the discharge, it is possible to reduce the possibility of occurrence of electric shock, burns of handlers of storage battery packs.

A 74th aspect of the present disclosure may be the method of operating a storage battery pack in the 73rd aspect, further including a step (s) of, in an abnormal condition of the storage battery pack, displaying information indicating the abnormality.

Thus, when abnormality occurs in the storage battery pack, the storage battery pack alone is able to notify an external entity of abnormality.

A 75th aspect of the present disclosure may be the method of operating a storage battery pack in the 73rd aspect, further including a step (t) of, in an abnormal condition of the storage battery pack, transmitting via a communicator provided in the storage battery pack to the charging device the information indicating the abnormality.

Thus, it is possible to detect an occurrence of abnormality of the storage battery pack on the charging device side.

A 76th aspect of the present disclosure may be the method of operating a storage battery pack in any one of the 61st, 66th to 75th aspects, further including: a step (u) of measuring a current which flows from the secondary battery to an electrical appliance connected to the connector by a current measure provided between the secondary battery and the power consumer; and a step (v) of measuring a current which flows from the secondary battery to the power consumer by the current measure.

Thus, it is possible to check a current value of the secondary battery when it is discharged, using the power consumer.

A 77th aspect of the present disclosure may be the method of operating a storage battery pack in the 61st aspect, in which not only the power consumer but also an electrical appliance connected to the connector is caused to consume the remaining power of the secondary battery in the step (h).

Thus, it is possible to determine more quickly whether or not continuous use of the secondary battery is allowed.

A 78th aspect of the present disclosure may be the method of operating a storage battery pack in any one of the 44th, 46th, 54th to 77th aspects, in which the circuit is activated by switching between presence and absence of electrical connection of the secondary battery and the power consumer to electrically connect the secondary battery and the power consumer.

In this manner, the discharge is performed by switching between presence and absence of electrical connection of the secondary battery and the power consumer.

Hereinafter, a storage battery pack according to an aspect of the present disclosure will be specifically described with reference to the drawings.

It is to be noted that each of the embodiments described below illustrates a specific example of the present disclosure. The numerical values, shapes, materials, components, arrangement positions and connection configuration of the components, steps, and order of the steps that are presented in the following embodiments are examples, which are not intended to limit the present disclosure. In the following embodiments, the components thereof, which are not described in the independent claim that defines the most generic concept of the present disclosure, are regarded as any components.

It is to be noted that each of the drawings is schematically illustrated, and is not necessarily illustrated accurately. In the drawings, essentially the same components are labeled with the same symbol, and a redundant description may be omitted or simplified.

First Embodiment

Figure 2:
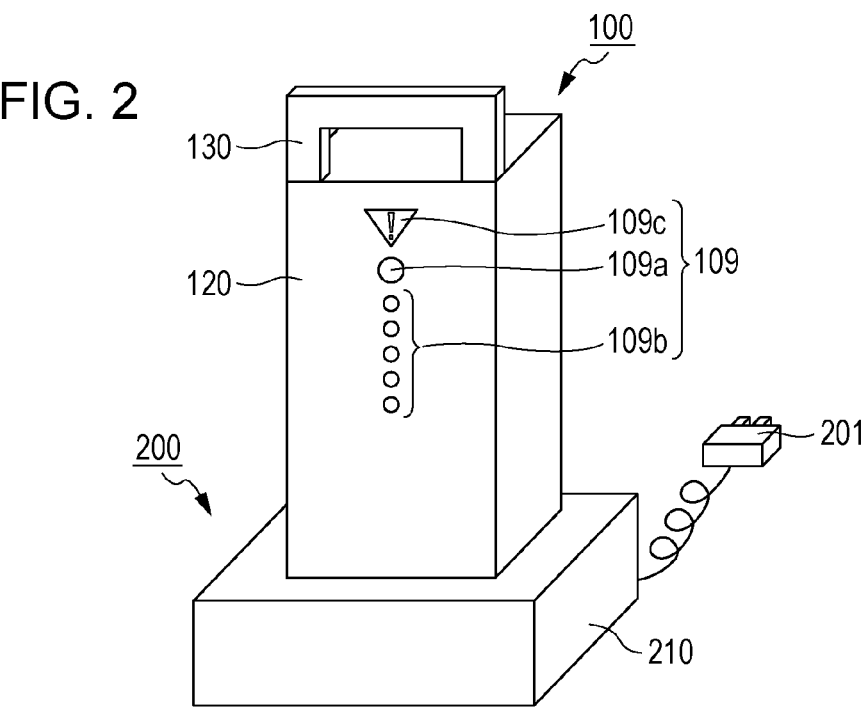
FIG. 2 is a perspective view of a storage battery pack connected to a charging device, according to the first embodiment.

A storage battery pack according to a first embodiment will be described.
[Entire Configuration]
The overall configuration of a storage battery pack 100 in the first embodiment will be described. FIG. 1 and FIG. 2 are perspective views of the storage battery pack and a charging device according to the first embodiment. FIG. 1 illustrates the storage battery pack 100 and the charging device 200 which are separated from each other, and FIG. 2 illustrates the storage battery pack 100 and the charging device 200 which are connected to each other.

First, the storage battery pack 100 will be described. As illustrated in FIG. 1 and FIG. 2, the storage battery pack 100 includes a main body 120, a connector 102, and a displayer 109.

The storage battery pack 100 is a storage battery pack connected to an electrical appliance. For instance, the storage battery pack 100 is utilized as a power supply for electrical appliances, electric tools used by electric mobile objects, consumers of electric power. Examples of an electric mobile body include an electric assisted bicycle, an electric motorcycle, an electric wheelchair, an electric vehicle, and a hybrid vehicle. Examples of electrical appliances used by consumers of electric power include an air conditioner, a lighting device, a refrigerator, a medical device, and an air-conditioning unit. Examples of electric tools include an electric drill.

It is to be noted that the storage battery pack 100 may be a storage battery pack exclusively for specific electrical appliances.

Also, the storage battery pack 100 may be used for electrical appliances of different types. For instance, the storage battery pack 100 may be used for both electric assisted bicycles and lighting devices.

The main body 120 is the body of the substantially rectangular parallelepiped-shaped storage battery pack 100 including a secondary battery and a control circuit for the secondary battery therein. The upper surface of the main body 120 is provided with a holder 130 a user to hold the storage battery pack 100 and a receiver 114, and the lower surface (bottom surface) of the main body 120 is provided with a connector 102. In this example, the holder 130 is a handle for the storage battery pack 100, but is for illustration only and is not limited to this.

The receiver 114 receives from an external entity a command for activating a circuit including a power consumer. The receiver 114 may be in any form as long as the receiver 114 is able to receive the above-mentioned command. The receiver 114 may be, for instance, a switch or a communicator that receives the above-mentioned command via wireless communication. The switch may be a mechanical switch such that when turned on by an operator, the remaining power of the secondary battery is consumed by the power consumer not via the controller, or may be a switch such that when turned on, the remaining power of the secondary battery is consumed via the controller. It is to be noted that the receiver 114 may be configured to allow depression thereof only by pointed end such as a pin in order to avoid erroneous depressing by a user.

Figure 3:
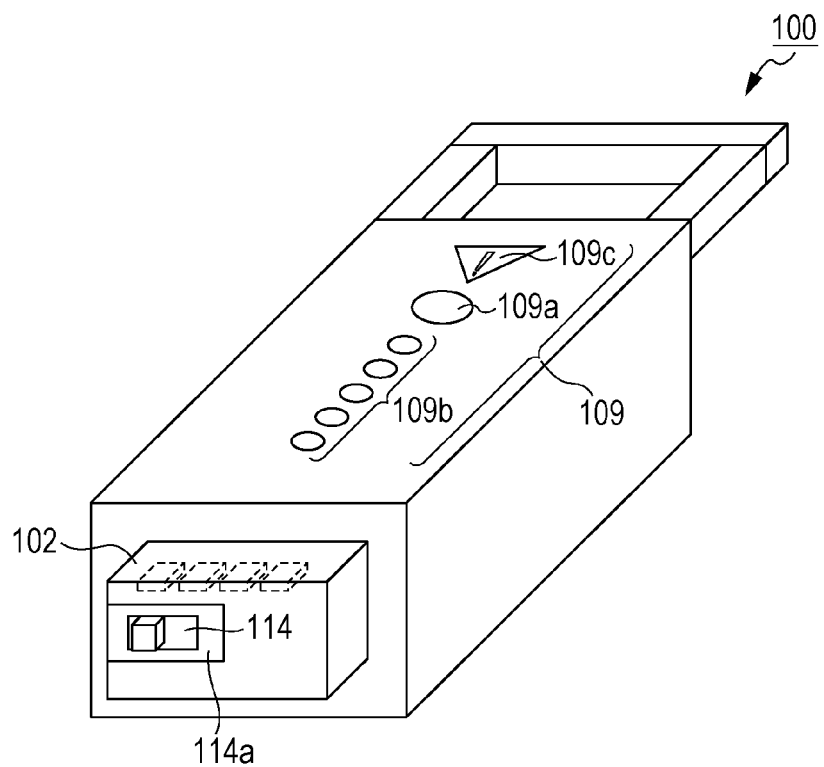
FIG. 3 is an outline view of a storage battery pack of another example in the first embodiment.

When the receiver 114 is a switch, the switch may be provided in the lower surface of the main body 120 as illustrated in FIG. 3. The switch as the receiver 114 may be covered by a seal 114a as illustrated in FIG. 3. In this case, the switch is operated with the seal 114a removed.

Alternatively, the above-mentioned external entity may be a commanding person or may be an external device. Examples of a commanding person include a user of the storage battery pack 100, and a collection contractor. Examples of an external device include an information terminal, a server system. Examples of an information terminal include, for instance, a mobile phone such as a smartphone, a smart tablet, a notebook PC.

When the above-mentioned command is received by the receiver 114, the remaining power of the secondary battery is consumed by the power consumer. Consequently, a command from an external entity allows to reduce the possibility of occurrence of electric shock, burns of handlers of storage battery packs. In addition, for instance, even at the occurrence of abnormality of the storage battery pack, when the command is executed by an external entity, consumption of the remaining power of the secondary battery is made by the power consumer, and when the command is not executed, the remaining power consumption is not made. That is, for instance, when abnormality occurs in the storage battery pack, the above-mentioned remaining power consumption is made appropriately as needed. In other words, for instance, when abnormality occurs in the storage battery pack, it is possible to reduce the possibility of making remaining power consumption although the consumption is unnecessary.

The connector 102 is mounted on an electrical appliance in a freely detachable manner. Terminals for charging or discharging the storage battery pack are provided in the connector 102. An electrical appliance connected to the connector 102 may be an electrical appliance that consumes the power of the secondary battery 101 and operates, or may be the charging device 200 that charges the secondary battery 101. When the connector 102 is connected to a terminal section 202 of the charging device 200, the terminals are electrically connected to an internal circuit of the charging device 200. It is to be noted that the connector 102 may be provided with a terminal for charge, a terminal for discharge, and a terminal for communication (for control) separately.

The displayer 109 includes a remaining amount display button 109a, a remaining amount displayer 109b, and an abnormality displayer 109c.

The remaining amount displayer 109b is principally a displayer that displays the remaining capacity of a secondary battery built in the storage battery pack 100. Specifically, the remaining amount displayer 109b includes light emitting diodes (LED), and the remaining capacity of the secondary battery is displayed by the number of LEDs which are lit. In addition, the remaining amount displayer 109b may also serve as a notifier that notifies of not only the remaining capacity of the secondary battery, but also other states of the storage battery pack. For instance, when the remaining amount displayer 109b is formed of a light emitter such as an LED, blinking of the light emitter may notify that the remaining power of the secondary battery 101 is being consumed by the power consumer 105, the storage battery pack 100 is being charged, or the storage battery pack is abnormal. Also, those multiple states may be distinguished and notified using at least one of the blinking rate of the light emitter and the number of blinking light emitters.

The remaining amount display button 109a is a button that is to be pressed by a user. When the remaining amount display button 109a is pressed, a certain number of LEDs (the remaining amount displayer 109b) in the remaining amount displayer 109b according to the remaining capacity of the secondary battery built in the storage battery pack 100 is lit.

The abnormality displayer 109c notifies an external entity of information indicating abnormality of the storage battery pack 100. Thus, at the occurrence of abnormality of the storage battery pack 100, the storage battery pack 100 alone is able to notify a user of the abnormality. The abnormality displayer 109c is formed of, for instance, an LED, but may be in any form as long as abnormality displayer 109c is able to notify an external entity of abnormality. For instance, information such as a text information, an image information indicating an occurrence of abnormality may be displayed on a display screen.

Next, the charging device 200 will be described. The charging device 200 includes a main body 210, a terminal section 202, and a plug 201.

The charging device 200 is a charger for the storage battery pack 100.

The main body 210 is the main body of the charging device 200, that houses an internal circuit and others of the charging device 200. A depressed portion provided in the upper surface of the main body 210 is the terminal section 202 to which the connector 102 of the storage battery pack 100 is connected, and a lateral face of the main body 210 is provided with the plug 201 via a power cable.

The terminal section 202 is a depressed portion having a shape and size that fit the connector 102, and the connector 102 is connected to the depressed portion in a freely detachable manner (detachably). The bottom surface of the terminal section 202 is provided with terminals that correspond to the terminals of the connector 102. The terminal section 202 and the connector 102 are connected, and thus each terminal in the terminal section 202 and each terminal provided in the connector 102 are connected. Thus, the internal circuit of the storage battery pack 100 and the internal circuit of the charging device 200 are electrically connected.

The plug 201 is an example of a power receiver, and is connected to a power supplier (for instance, an outlet) of an external power supply in order to receive supply of power from the external power supply by the charging device 200. Here, examples of an external power supply include a self-power generation type power supply such as a commercial system, or a solar cell system, a fuel cell system. It is to be noted that the charging device 200 may receive supply of power from an external power supply via a USB connector (USB socket) instead of the plug 201.

[System Configuration]

Figure 4:
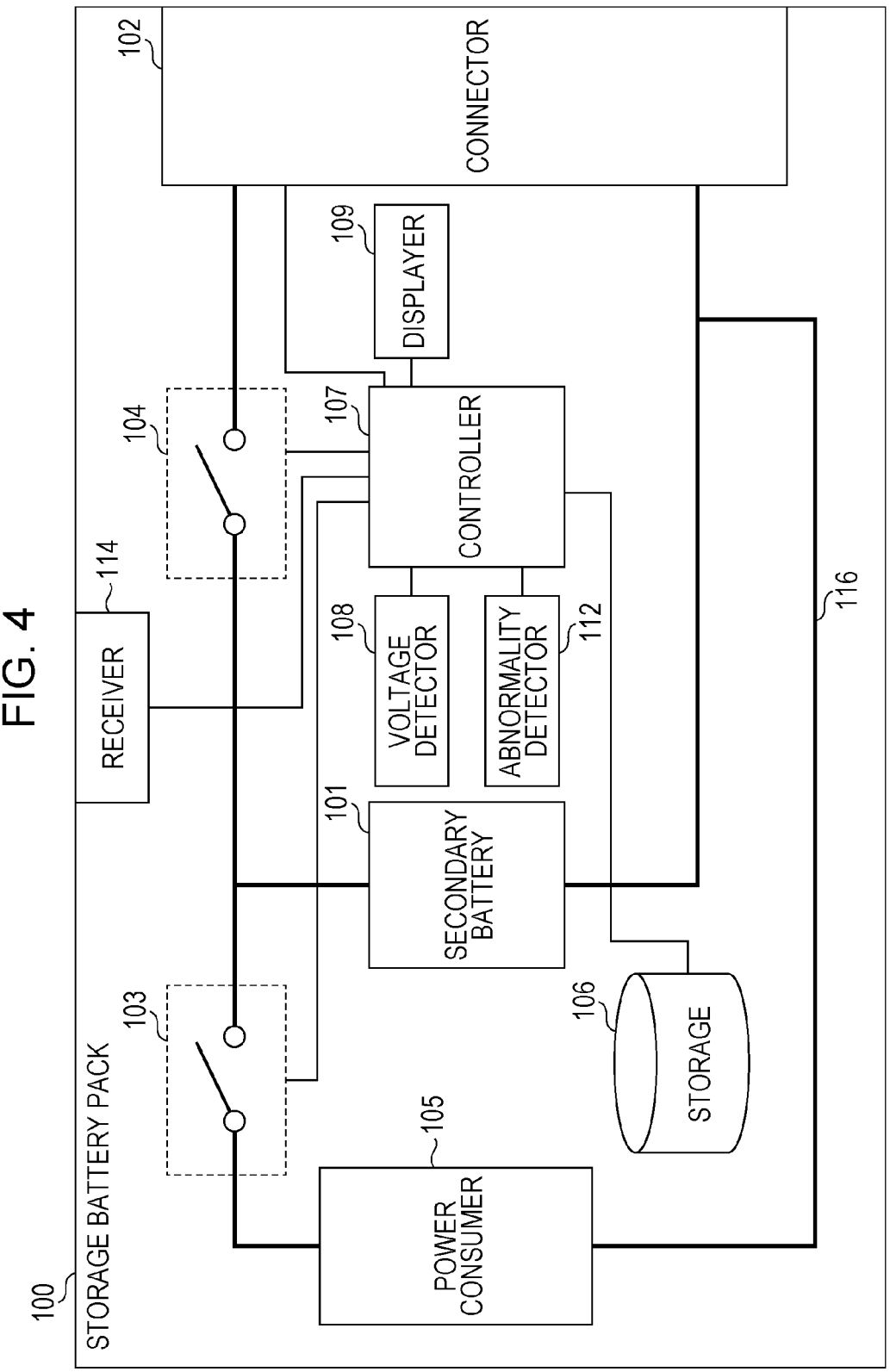
FIG. 4 is a block diagram illustrating a system configuration of the storage battery pack according to the first embodiment.

Next, the system configuration of the storage battery pack 100 will be described. FIG. 4 is a block diagram illustrating the system configuration of the storage battery pack 100 according to the first embodiment.

As illustrated in FIG. 4, the storage battery pack 100 includes a secondary battery 101, a connector 102, a switch 103, a switch 104, a power consumer 105, a storage 106, a controller 107, a voltage detector 108, a displayer 109, an abnormality detector 112 and a circuit 116.

The secondary battery 101 is formed by connecting electric cells (for instance, a lithium-ion battery, a nickel hydride battery) in parallel or in series.

The connector 102 is connected to the terminal section 202 of the charging device 200 in a freely detachable manner in order to charge the secondary battery 101 as described above. Also, the connector 102 is connectable (electrically and mechanically connectable) to an electrical appliance in a freely detachable manner.

The switch 103 a change switch (switcher) that switches ON and OFF of electrical connection, that is, presence and absence of electrical connection between the secondary battery 101 and the power consumer 105 based on the control of the controller 107. As the switch 103, for instance, a MOSFET, a relay or the like is used. Also, when the receiver 114 and the switch 103 are mechanical switches, ON and OFF of the switch 104 are not switched by the control of the controller 107, but is directly switched by an operation of an operator on the receiver 114.

The switch 104 is a change switch (switcher) that switches between ON and OFF of electrical connection of the secondary battery 101 and the connector 102 based on the control of the controller 107. As the switch 104, for instance, a MOSFET or the like is used. When the voltage of the secondary battery 101 reaches a standard value (discharge cutoff voltage) at which discharge of the secondary battery 101 is stopped, the switch 104 is opened by the control of controller 107. In other words, the switch 104 is an example of the switching element of the present disclosure.

The power consumer 105 is a load for causing the secondary battery 101 to discharge. The power consumer 105 is, for instance, a resistor body, a heater, or a PTC thermistor.

The storage 106 holds the voltage value of the secondary battery 101. Also, the storage 106 may hold not only the voltage value of the secondary battery 101, but also other state values indicating the state of the secondary battery. Examples of the other state values of the secondary battery include the remaining capacity of the secondary battery, the output current of the secondary battery, the temperature of the secondary battery, and a degree of deterioration of the secondary battery. As the degree of deterioration of the secondary battery, for instance, the number of cycles of charge and discharge of the secondary battery, the internal resistance of the secondary battery, or the learning capacity of the secondary battery may be used. It is to be noted that the voltage value of the secondary battery, the output current value of the secondary battery may be included in the value indicating the remaining capacity as a physical quantity correlated with the remaining capacity.

The storage 106 may be any memory device, for instance, a semiconductor memory such as a flash memory.

The controller 107 controls the operation of the circuit 116. The controller 107 may be a unit that has a control function, and includes an arithmetic processor (not illustrated) and a storage (not illustrated) that stores a control program. Examples of an arithmetic processor include an MPU and a CPU. Examples of a storage include a memory. The controller may be formed of a single controller that performs centralized control or formed of controllers that work in a cooperative manner to perform distributed control. It is to be noted that the storage 106 may also serves as the above-mentioned storage that stores a control program.

Specifically, the controller 107 outputs a control signal to the switch 103, thereby controlling ON and OFF of the switch 103. Thus, the operation of the circuit 116 is turned ON or OFF, and power consumption of the secondary battery 101 by the power consumer 105 can be turned ON or OFF. In addition, the controller 107 outputs a control signal to the switch 104, thereby controlling ON and OFF of the switch 104. The controller 107 is able to turn ON or OFF power supply of the secondary battery 101 to an electrical appliance via the connector 102 by such control of the switch 104. Also, when the secondary battery 101 is connected to the charging device 200 via the connector 102, the switch 104 is turned ON or OFF, thereby allowing charge to the secondary battery 101 to be ON or OFF. Also, the controller 107 fetches data indicating the voltage value of the secondary battery 101 detected by the voltage detector 108, and stores the data in the storage 106. Although the controller 107 is specifically a microcomputer, the controller 107 may be formed of a processor or a dedicated circuit.

The voltage detector 108 detects the voltage of the secondary battery 101. The voltage detector 108 may detect, for instance, the voltage itself of the secondary battery 101 or may detect a physical quantity correlated with the voltage. Examples of a physical quantity correlated with the voltage include the remaining capacity of the secondary battery 101, the output current of the secondary battery 101. Although the voltage detector 108 is specifically a dedicated circuit (IC), the voltage detector 108 may be achieved as a microcomputer or a processor.

The displayer 109 displays various states or operations of the secondary battery 101 as described with reference to FIG. 1 and FIG. 2.

The abnormality detector 112 detects abnormality of the storage battery pack 100 and notifies the controller 107 of the abnormality. The abnormality detector 112 may be in any form as long as it detects abnormality of the storage battery pack 100. Specifically, the abnormality detector 112 is, for instance, a sensor that detects a state value of the secondary battery, an impact sensor, a submersion sensor, or a disassemble sensor. In the case where the abnormality detector 112 is an impact sensor, the impact sensor is able to measure not only the presence or absence of an impact received by the storage battery pack 100, but also the magnitude and direction of the impact, and may be a sensor that is able to record the history received impacts. Examples of abnormality in the state value of the secondary battery include, for instance, voltage abnormality, temperature abnormality, deterioration degree abnormality (battery life), and short-circuit abnormality of the secondary battery. An example of voltage abnormality is abnormality in the voltage balance of the cells included in the secondary battery 101. An example of temperature abnormality is the state where the temperature of the secondary battery 101 reaches a threshold value or higher (high temperature abnormality). An example of battery life is the state where the number of cycles of charge and discharge of the secondary battery 101 reaches a threshold value or higher. An example of short-circuit abnormality is the state where the amount of voltage reduction of the secondary battery 101 during no discharge of the secondary battery 101 is a threshold value or higher. It is to be noted that when the above-mentioned abnormality includes the voltage abnormality, the voltage detector 108 is also used as the abnormality detector 112.

The circuit 116 is an electrical circuit including the power consumer 105. Specifically, the circuit 116 includes the secondary battery 101, the switch 103, the power consumer 105, and an electrical conductor that connects these elements. The electrical conductor is, for instance, a conductive wire. As illustrated in FIG. 4, the circuit 116 branches from a circuit including the switch 104, in an electric line upstream of the switch 104 with respect to the secondary battery 101. In other words, the circuit 116 does not include the switch 104 as a switching element. Thus, when the circuit 116 is activated, even when the voltage of the secondary battery 101 is lower than a discharge cutoff voltage, the remaining power of the secondary battery 101 is consumed by the power consumer 105.

First Example

The operation of the storage battery pack 100 in the first example will be described.

Figure 5:
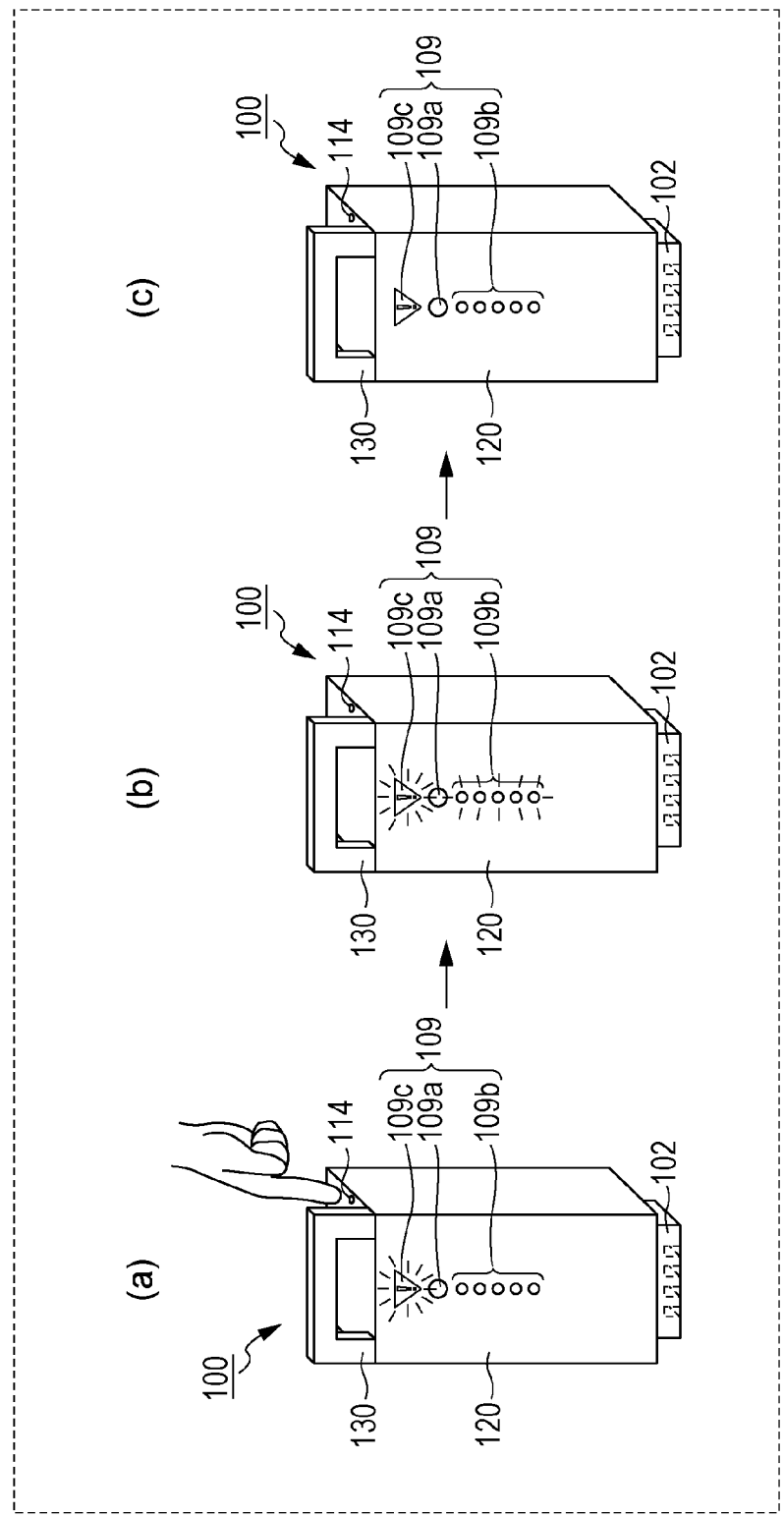
FIG. 5 is a diagram illustrating an operational flow of the storage battery pack in the first example.

FIG. 5 is a diagram illustrating the operational flow of the storage battery pack in the first example.

Figure 6:
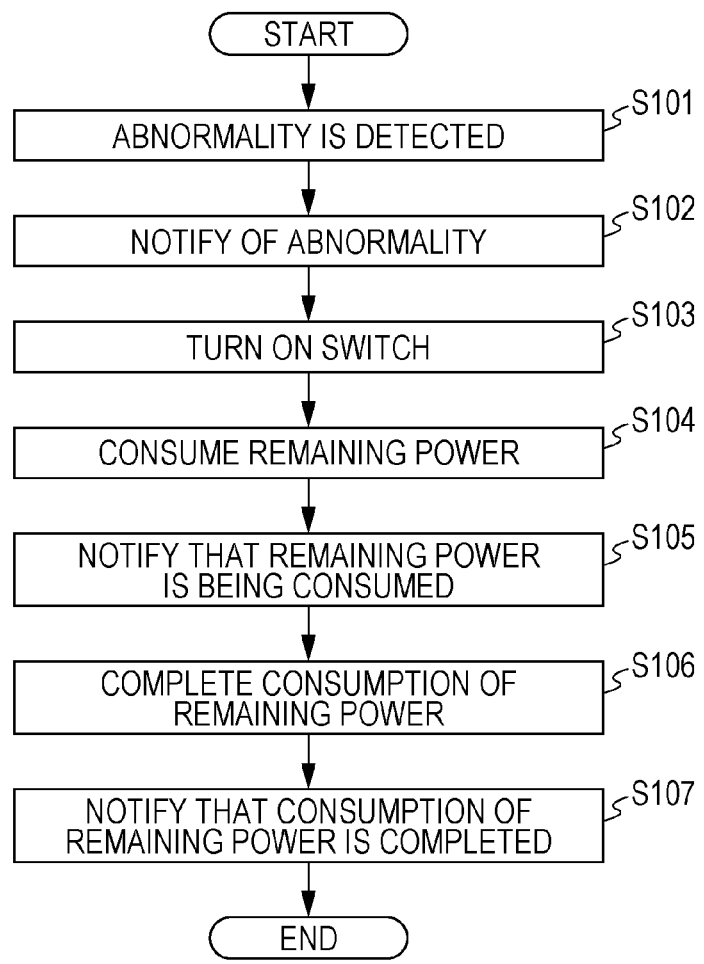
FIG. 6 is a flow chart illustrating an operation of the storage battery pack in the first example.

FIG. 6 is a flow chart illustrating the operation of the storage battery pack in the first example.

In the storage battery pack 100 in the present example, when abnormality of the storage battery pack 100 is detected by the abnormality detector 112 (S101), an external entity is notified of an occurrence of the abnormality via the displayer 109c (S102). In the present example, as illustrated in FIG. 5(a), an LED serving as the abnormality displayer 109c is lit to notify of an occurrence of abnormality.

Here, when an operator performs ON operation for a switch serving as the receiver 114 (S103), the switch 103 is closed (ON) by the controller 107, and the circuit 116 is activated and the remaining power of the secondary battery 101 is consumed by the power consumer 105 (S104). In addition, an external entity is notified that the remaining power of the secondary battery 101 is being consumed (S105). Specifically, the consumption of the remaining power of the secondary battery 101 in S104 is made until the voltage of the secondary battery 101 falls below the discharge cutoff voltage. Even though an electrical appliance is connected to the connector of the storage battery pack 100, since the switch 104 is opened (OFF) by the controller 107 due to an occurrence of abnormality, the remaining power of the secondary battery 101 is not supplied to the electrical appliance in S104. In S105, specifically, as illustrated in FIG. 5(b), a light emitter serving as the remaining amount displayer 109b blinks, thereby notifying an external entity that the remaining power of the secondary battery 101 is being consumed. Examples of an operator include a user of the storage battery pack 100, a collection contractor who collects the storage battery pack 100, a waste disposal contractor who discards the collected storage battery pack 100.

When the switch 103 is opened (OFF) by the controller 107, and the operation of the circuit 116 is stopped, the consumption of the remaining power of the secondary battery 101 by the power consumer 105 is completed (S106).

Also, an external entity is notified that the consumption of the remaining power of the secondary battery 101 is completed (S107). In the present example, as illustrated in FIG. 5(c), the light emitter serving as the remaining amount displayer 109b stops blinking, thereby notifying an external entity that the consumption of the remaining power of the secondary battery 101 is completed.

Second Example

A storage battery pack 100 in a second example will be described.

Figure 7:
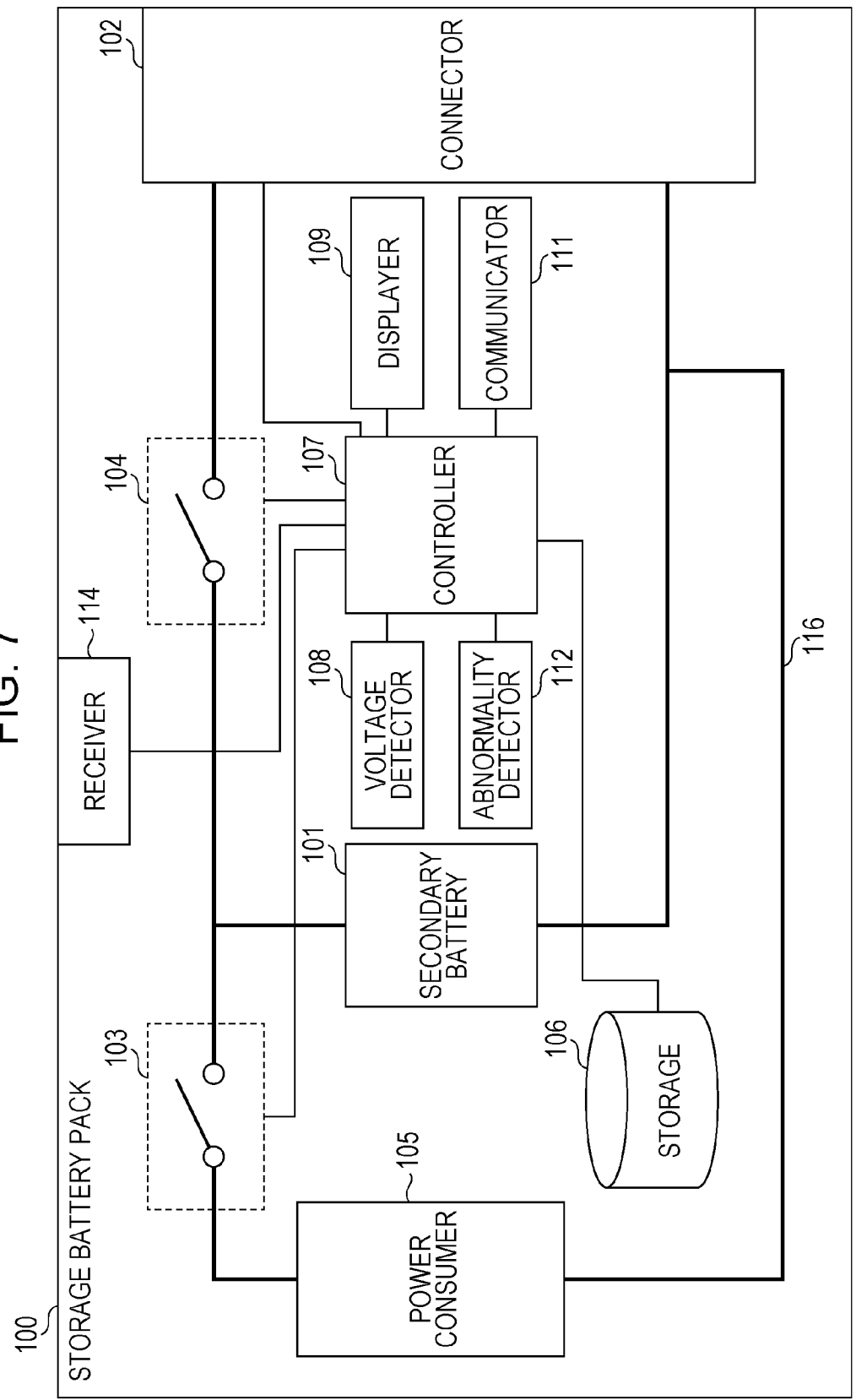
FIG. 7 is a block diagram illustrating a system configuration of a storage battery pack in a second example.

FIG. 7 is a block diagram illustrating the system configuration of the storage battery pack in the second example.

As illustrated in FIG. 7, the storage battery pack 100 of the present example includes a communicator 111. The communicator 111 performs wireless communication with an external device such as an information terminal, a server system. In the present example, the communicator 111 is a communicator that performs short-distance wireless communication such as Bluetooth (registered trademark), Zigbee (registered trademark), NFC, and Wi-Fi, and communicates with an information terminal. It is to be noted that the communicator 111 may be a communicator that performs wireless communication such as LTE which has a longer communication distance than short-distance wireless communication. The configuration except for this is the same as the system configuration of the storage battery pack 100 in the first example illustrated in FIG. 4.

Next, the operation of the storage battery pack 100 in the present example will be described.

Figure 8:
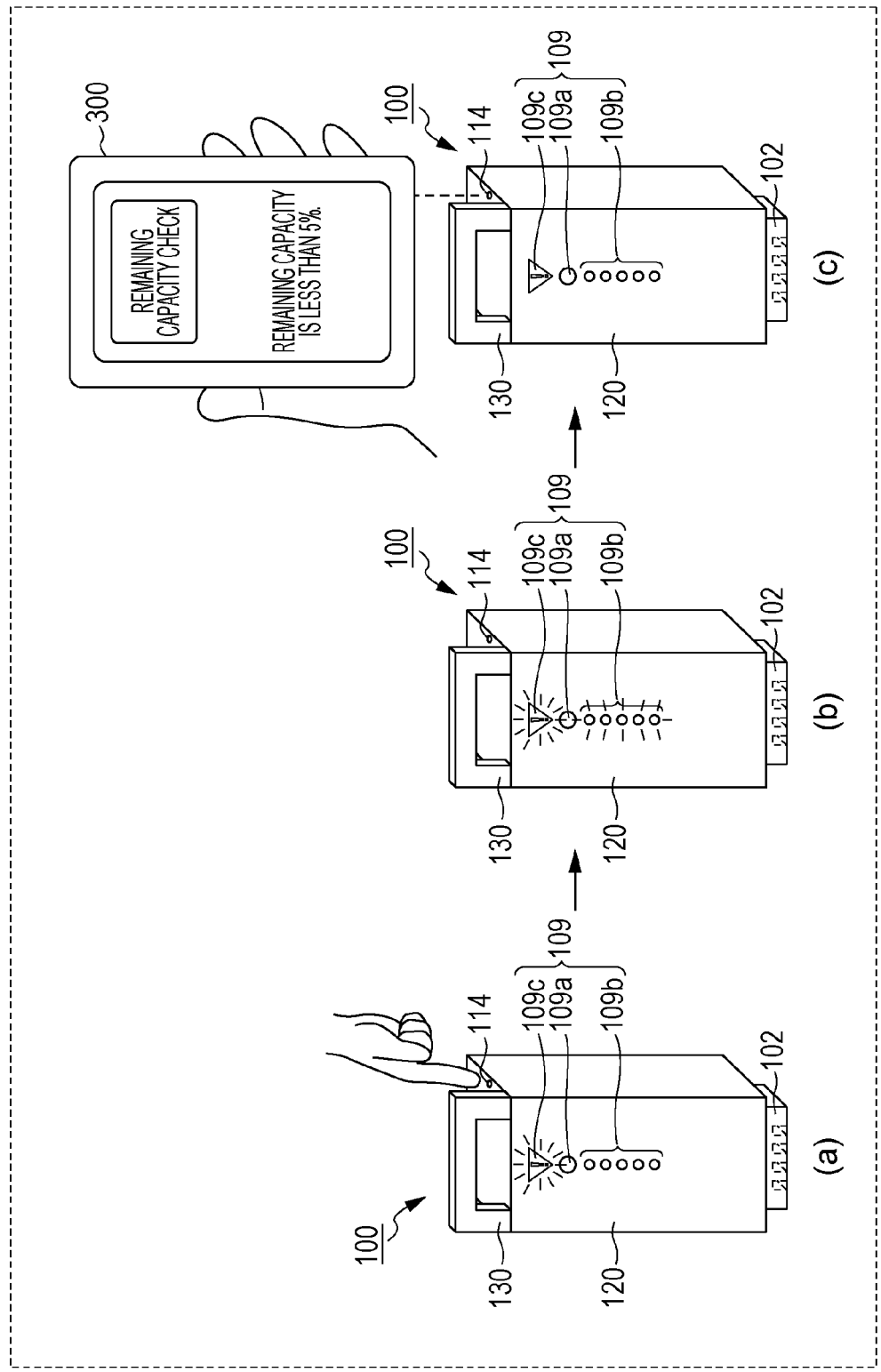
FIG. 8 is a diagram illustrating an operational flow of the storage battery pack in the second example.

FIG. 8 is a diagram illustrating the operational flow of the storage battery pack in the second example.

Figure 9:
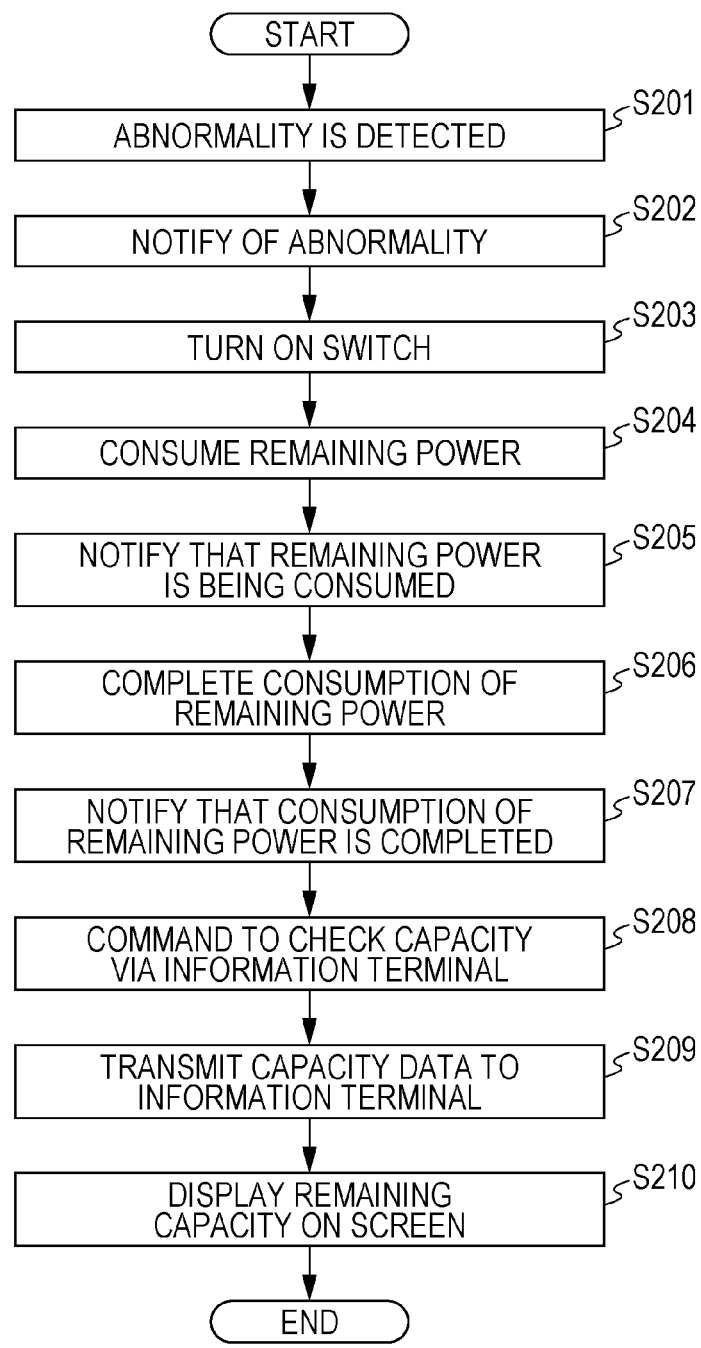
FIG. 9 is a flow chart illustrating an operation of the storage battery pack in the second example.

FIG. 9 is a flow chart illustrating the operation of the storage battery pack in the second example.

The operation of the storage battery pack 100 in the present example is such that when abnormality of the storage battery pack 100 is detected (S201), an external entity is notified of an occurrence of the abnormality via the displayer 109c (S202). In the present example, as illustrated in FIG. 8(a), an LED serving as the abnormality displayer 109c is lit to notify of an occurrence of abnormality.

Here, when an operator performs ON operation for a switch serving as the receiver 114 (S203), the switch 103 is closed (ON) by the controller 107, and the circuit 116 is activated and the remaining power of the secondary battery 101 is consumed by the power consumer 105 (S204). In addition, an external entity is notified that the remaining power of the secondary battery 101 is being consumed (S205). It is to be noted that the consumption of the remaining power of the secondary battery 101 in S204 is specifically the same as in the first example. Also, the notification in S205 is the same as in the first example. Examples of an operator include a user, a collection contractor, a waste disposal contractor of the storage battery pack 100.

When the switch 103 is opened (OFF) by the controller 107, and the operation of the circuit 116 is stopped, the consumption of the remaining power of the secondary battery 101 is completed (S206). An external entity is notified that the consumption of the remaining power of the secondary battery 101 is completed (S207). In S206, the consumption of the remaining power of the secondary battery 101 is terminated in a state where the capacity is left that allows the subsequent operation (S209) of the storage battery pack 100 to be performed. The notification in S207 is specifically the same as in the first example.

Next, an operator operates the information terminal 300 to command the storage battery pack 100 to check the remaining capacity of the storage battery pack 100 (S208). The storage battery pack 100 receives the command via the communicator 111, and the controller 107 transmits information indicating the remaining capacity of the secondary battery 101 held in the storage 106 to the information terminal 300 via the communicator 111 (S209). The information terminal 300 displays the above-mentioned received information on a screen (S210). In the present example, as illustrated in FIG. 8(c), the information on the remaining capacity of the storage battery pack 100 is displayed as a ratio (%) of the remaining capacity with respect to the capacity at full charge of the storage battery pack 100. In calculation of the ratio, when the voltage of the secondary battery 101 is the discharge cutoff voltage (for instance, 3.2 V), the ratio is not 0%, but when the voltage is 0 V, the ratio is 0%.

Third Example

Unlike the first example, in a storage battery pack 100 in a third example, the receiver 114 is a communicator that performs wireless communication with the information terminal 300. In the present example, the receiver 114 is a communicator that performs short-distance wireless communication such as Bluetooth (registered trademark), Zigbee (registered trademark), NFC, and Wi-Fi, and communicates with an information terminal. It is to be noted that the receiver 114 may be a communicator that performs wireless communication such as LTE which has a longer communication distance than short-distance wireless communication. The configuration except for this is the same as the system configuration of the storage battery pack 100 in the first example illustrated in FIG. 4.

Next, the operation of the storage battery pack 100 in the third example will be described.

Figure 10:
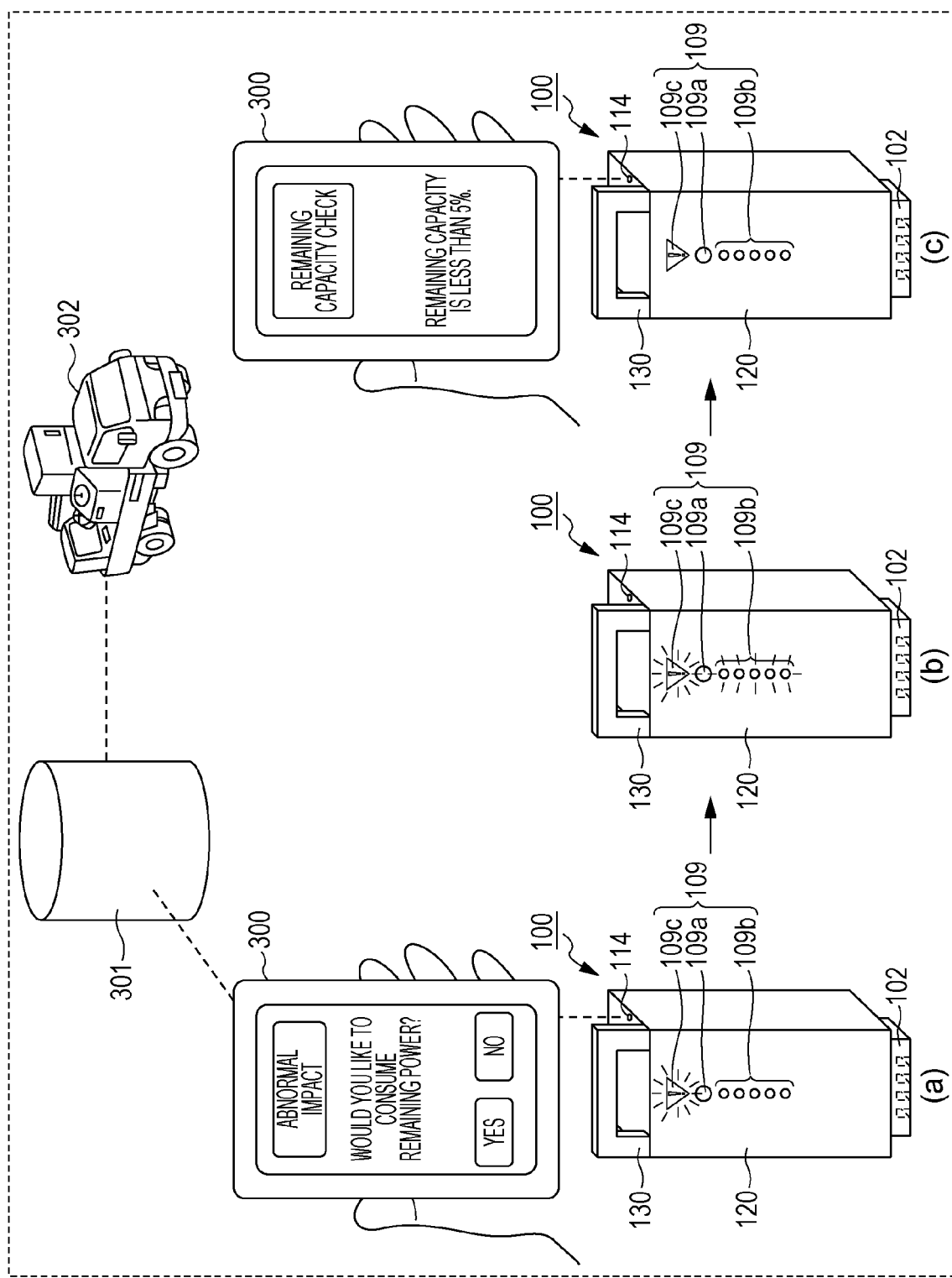
FIG. 10 is a diagram illustrating an operational flow of a storage battery pack of a third example.

FIG. 10 is a diagram illustrating the operational flow of the storage battery pack in the third example.

Figure 11:
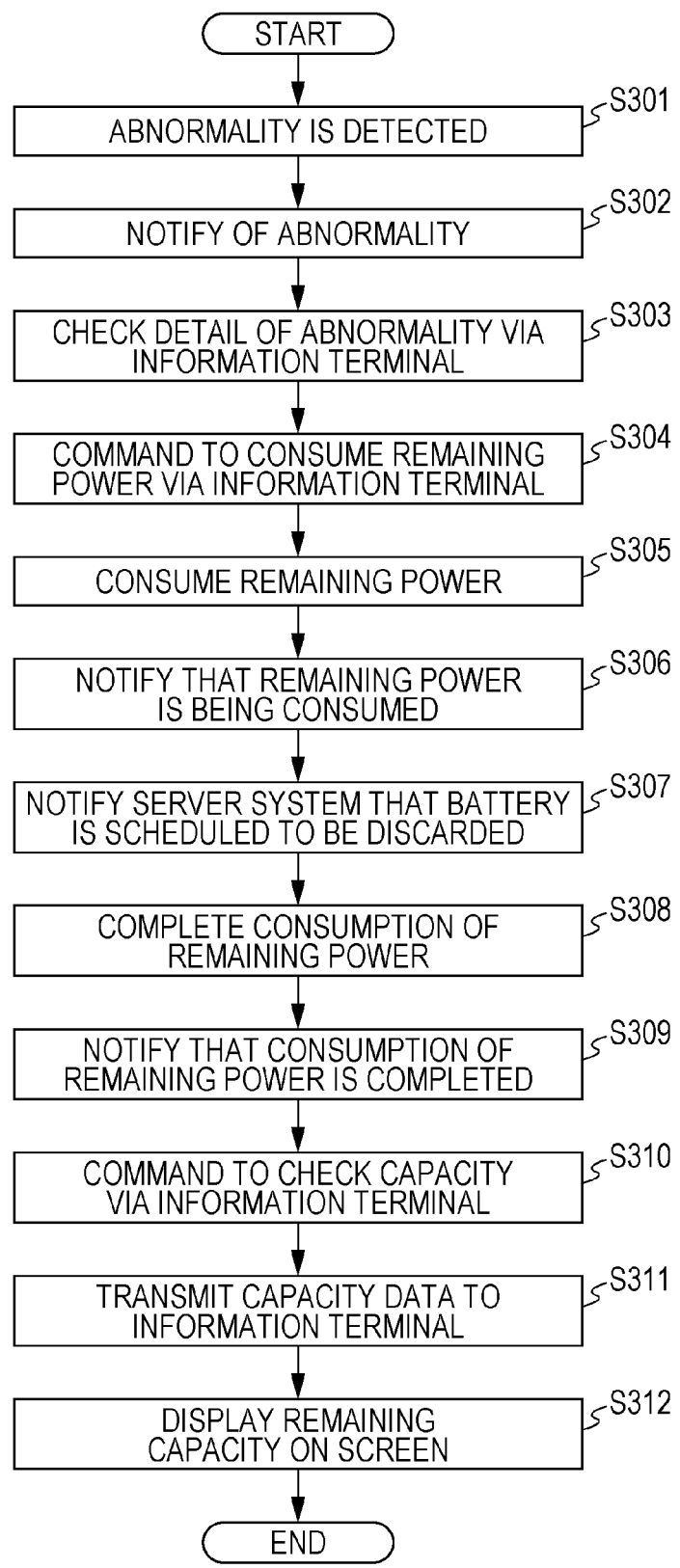
FIG. 11 is a flow chart illustrating an operation of the storage battery pack of the third example.

FIG. 11 is a flow chart illustrating the operation of the storage battery pack in the third example.

The operation of the storage battery pack 100 in the present example is such that when abnormality of the storage battery pack 100 is detected (S301), an external entity is notified of an occurrence of the abnormality by the storage battery pack 100 (S302). In the present example, the notification is made by the abnormality displayer 109c. Specifically, as illustrated in FIG. 10(a), an LED serving as the abnormality displayer 109c is lit to notify of an occurrence of abnormality. When notification of abnormality is made, an operator operates the information terminal 300 to check the detail of the abnormality (S303). Specifically, a check request for the detail of the abnormality is transmitted to the receiver 114 from the information terminal 300 by an operation of an operator. When the receiver 114 receives the above-mentioned check request, information (for instance, impact abnormality) indicating the detail of the abnormality held in the storage 106 is transmitted to the information terminal 300 by the controller 107, and the information is displayed on the screen of the information terminal 300.

Here, when an operator operates the information terminal 300 to command the power consumer 105 to consume the remaining power of the secondary battery 101 (S304), the switch 103 is closed (ON) by the controller 107, and the circuit 116 is activated and the remaining power of the secondary battery 101 is consumed by the power consumer 105 (S305). In addition, an external entity is notified that the remaining power of the secondary battery 101 is being consumed (S306). The consumption of the remaining power of the secondary battery 101 in S305 is specifically the same as in the first example. The notification in S306 is specifically the same as in the first example. Examples of an operator include a user, a collection contractor, a waste disposal contractor of the storage battery pack 100. The above-mentioned command by an operator causes a collection contractor 302 to be notified that the storage battery pack 100 is scheduled to be discarded (S307). In the present example, specifically, information indicating that the storage battery pack 100 is scheduled to be discarded is transmitted from the information terminal 300 to the server system 301 which notifies the collection contractor 302 of the information.

When the switch 103 is opened (OFF) by the controller 107, and the operation of the circuit 116 is stopped, the consumption of the remaining power of the secondary battery 101 is completed (S308). Also, an external entity is notified that the consumption of the remaining power of the secondary battery 101 is completed (S309). The notification in S309 is specifically the same as in the first example.

Next, when an operator operates the information terminal 300 to command the storage battery pack 100 to check the remaining capacity of the storage battery pack 100, the information indicating the remaining capacity of the secondary battery 101 is displayed on the screen of the information terminal 300 (S310 to S312). Specifically, the detail of the display is the same as in the second example.

Fourth Example

A storage battery pack 100 in a fourth example will be described. The system configuration of the storage battery pack 100 in the present example is the same as in the third example. In other words, the receiver 114 is a communicator that performs wireless communication with the information terminal 300.

Next, the operation of the storage battery pack 100 in the fourth example will be described.

Figure 12:
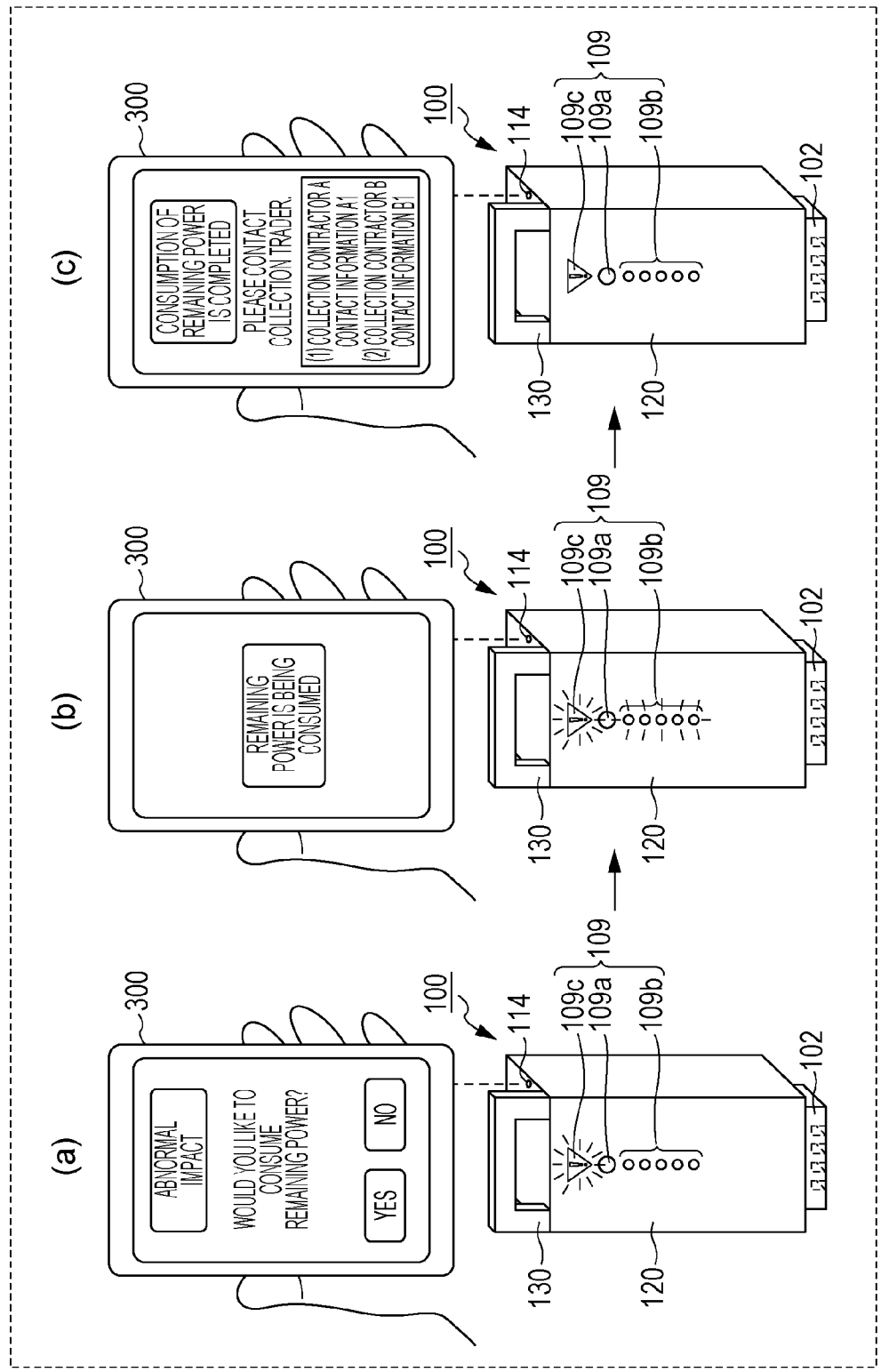
FIG. 12 is a diagram illustrating an operational flow of a storage battery pack of a fourth example.

FIG. 12 is a diagram illustrating the operational flow of the storage battery pack in the fourth example.

Figure 13:
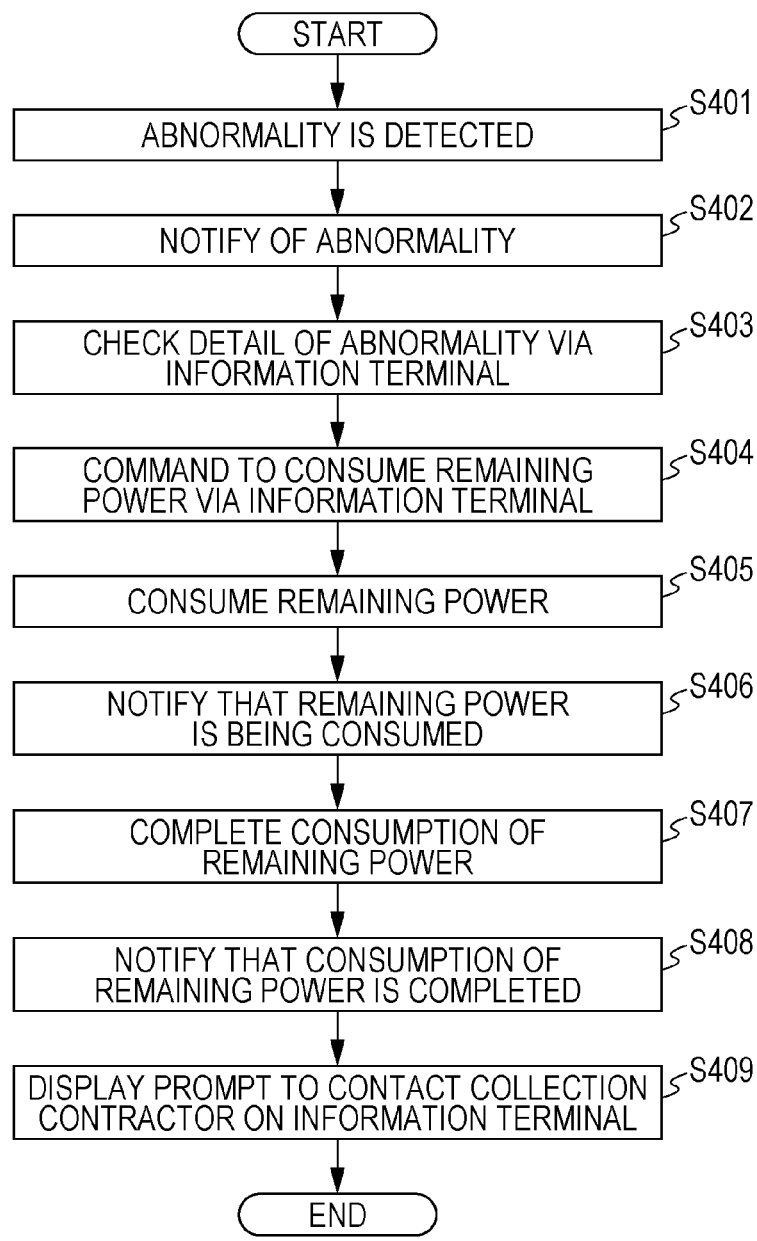
FIG. 13 is a flow chart illustrating an operation of the storage battery pack of the fourth example.

FIG. 13 is a flow chart illustrating the operation of the storage battery pack in the fourth example.

The operation of the storage battery pack 100 in the present example is such that when abnormality of the storage battery pack 100 is detected (S401), an external entity is notified of an occurrence of the abnormality by the storage battery pack 100 (S402). When notification of abnormality is made, an operator operates the information terminal 300 to check the detail of the abnormality (S403). The notification of the abnormality and the check of the detail of the abnormality are specifically the same as in the third example.

Here, when an operator operates the information terminal 300 to command the power consumer 105 to consume the remaining power of the secondary battery 101 (S404), the switch 103 is closed (ON) by the controller 107, and the circuit 116 is activated and the remaining power of the secondary battery 101 is consumed by the power consumer 105 (S405). In addition, an external entity is notified that the remaining power of the secondary battery 101 is being consumed (S406). The consumption of the remaining power of the secondary battery 101 in S405 is specifically the same as in the first example. Also, in S406, the notification by the remaining amount displayer 109b and the notification to the information terminal via the receiver 114 are made. Specifically, as illustrated in FIG. 12(b), a light emitter serving as the remaining amount displayer 109b blinks, thereby notifying an external entity that the remaining power of the secondary battery 101 is being consumed. Also, information indicating that the remaining power of the secondary battery is being consumed is transmitted by the controller 107 to the information terminal 300 via the receiver 114, and the information is displayed on the information terminal 300. Examples of an operator include a user, a collection contractor, a waste disposal contractor of the storage battery pack 100.

When the switch 103 is opened (OFF) by the controller 107, and the operation of the circuit 116 is stopped, the consumption of the remaining power of the secondary battery 101 is completed (S407). Also, an external entity is notified that the consumption of the remaining power of the secondary battery 101 is completed (S408). In the present example, the notification by the remaining amount displayer 109b and the notification to the information terminal 300 via the receiver 114 are made. Specifically, as illustrated in FIG. 10(c), the light emitter serving as the remaining amount displayer 109b stops blinking, thereby notifying an external entity that the consumption of the remaining power of the secondary battery 101 is completed. Also, information indicating that consumption of the remaining power of the secondary battery is completed is transmitted by the controller 107 to the information terminal 300 via the receiver 114, and the information is displayed on the information terminal 300.

Also, when the consumption of the remaining power of the secondary battery 101 is completed, the information terminal 300 is notified of information to prompt contact with a collection contractor (S409). Specifically, as illustrated in FIG. 12(c), when the consumption of the remaining power of the secondary battery 101 is completed, the controller 107 notifies via the receiver 114 the information terminal 300 of information to prompt contact with a collection contractor. The information includes, for instance, a message to prompt contact with a collection contractor, and the information may further include the name of a collection contractor and contact information. Several names of collection contractors and their contact information may be provided, and those may be displayed as a list on the screen of the information terminal 300.

Fifth Example

A storage battery pack 100 in a fifth example will be described. The system configuration of the storage battery pack 100 in the present example is the same as in the first example. In other words, the receiver 114 is a switch that receives an operation of an operator.

Next, the operation of the storage battery pack 100 in the fifth example will be described.

Figure 14:
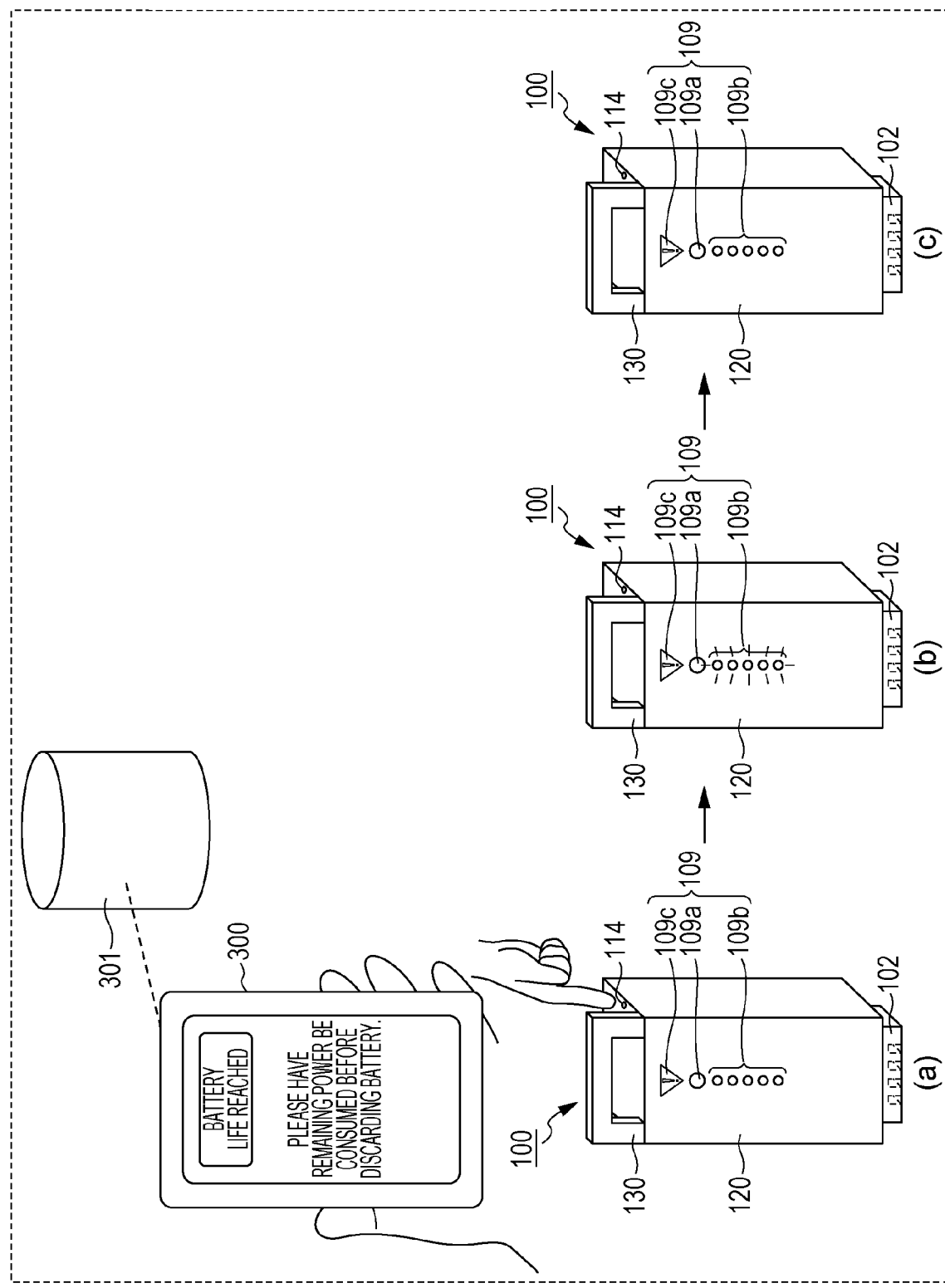
FIG. 14 is a diagram illustrating an operational flow of a storage battery pack of a fifth example.

FIG. 14 is a diagram illustrating the operational flow of the storage battery pack in the fifth example.

Figure 15:
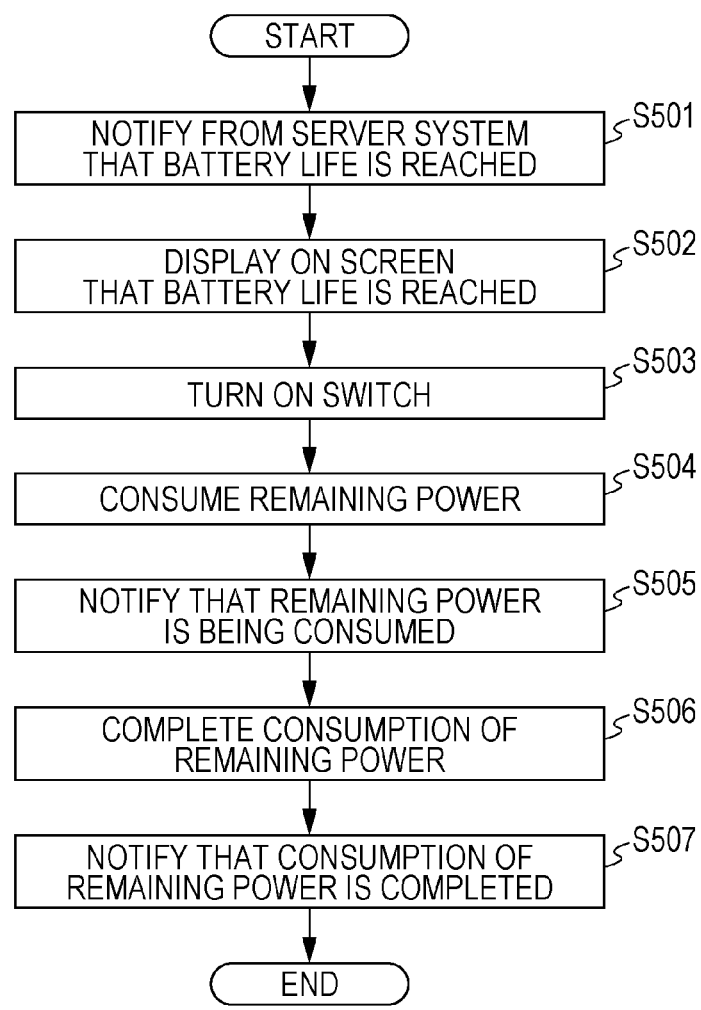
FIG. 15 is a flow chart illustrating an operation of the storage battery pack of the fifth example.

FIG. 15 is a flow chart illustrating the operation of the storage battery pack in the fifth example.

In the storage battery pack 100 in the present example, information indicating that the life of the storage battery pack 100 is reached is transmitted to the information terminal 300 from the server system 301 (S501), and the information is displayed on the screen of the information terminal 300 (S502). Although not illustrated in FIG. 14 and FIG. 15, a notifier provided in the storage battery pack 100 may notify an external entity that the battery life is reached. For instance, the abnormality displayer 109c or the remaining amount displayer 109b may be used as the notifier, and a notifier different from these displayers may be separately provided.

When an operator who has checked that the battery life is reached performs ON operation for a switch serving as the receiver 114 on the screen of the information terminal 300 (S503), the remaining power of the secondary battery 101 is consumed by the power consumer 105 (S504), and an external entity is notified that the remaining power of the secondary battery 101 is being consumed (S505). The consumption of the remaining power of the secondary battery 101 in S504 is specifically the same as in the first example. The notification in S505 is specifically the same as in the first example as illustrated in FIG. 14(b). Examples of an operator include a user, a collection contractor, a waste disposal contractor of the storage battery pack 100.

When the switch 103 is opened (OFF) by the controller 107, and the operation of the circuit 116 is stopped, the consumption of the remaining power of the secondary battery 101 is completed (S506). Also, an external entity is notified that the consumption of the remaining power of the secondary battery 101 is completed (S507). The notification in S507 is specifically the same as in the first example as illustrated in FIG. 14(c).

Although not described above, similarly to the second example, the storage battery pack 100 may further include the communicator 111, and after the consumption of the remaining power of the secondary battery 101 is completed, the remaining capacity of the storage battery pack 100 may be checked via the information terminal 300.

Sixth Example

A storage battery pack 100 in a sixth example will be described. The system configuration of the storage battery pack 100 in the present example is the same as in the third example. In other words, the receiver 114 is a communicator that performs wireless communication with the information terminal 300.

Next, the operation of the storage battery pack 100 in the sixth example will be described.

Figure 16:
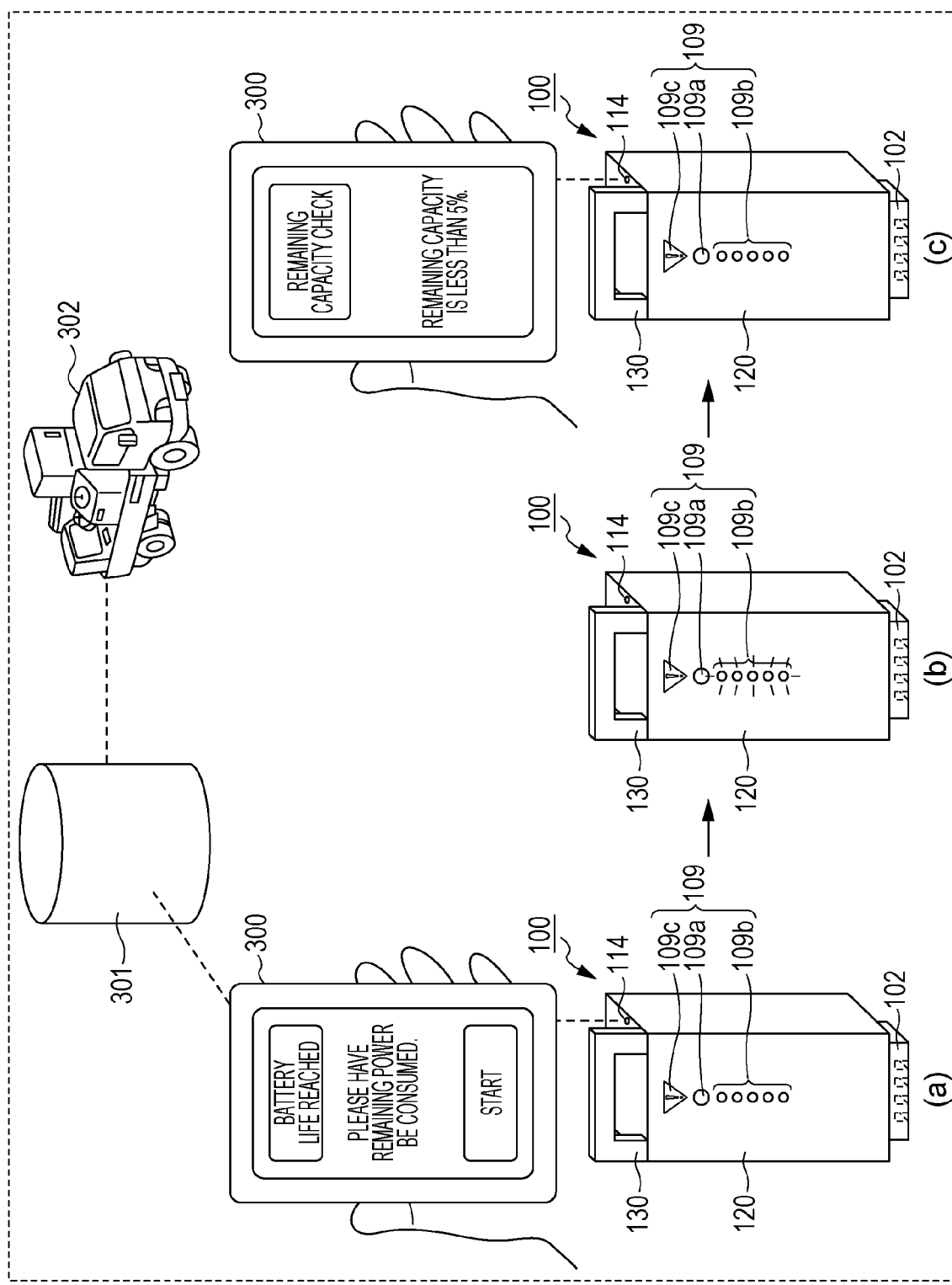
FIG. 16 is a diagram illustrating an operational flow of a storage battery pack of a sixth example.

FIG. 16 is a diagram illustrating the operational flow of the storage battery pack in the sixth example.

Figure 17:
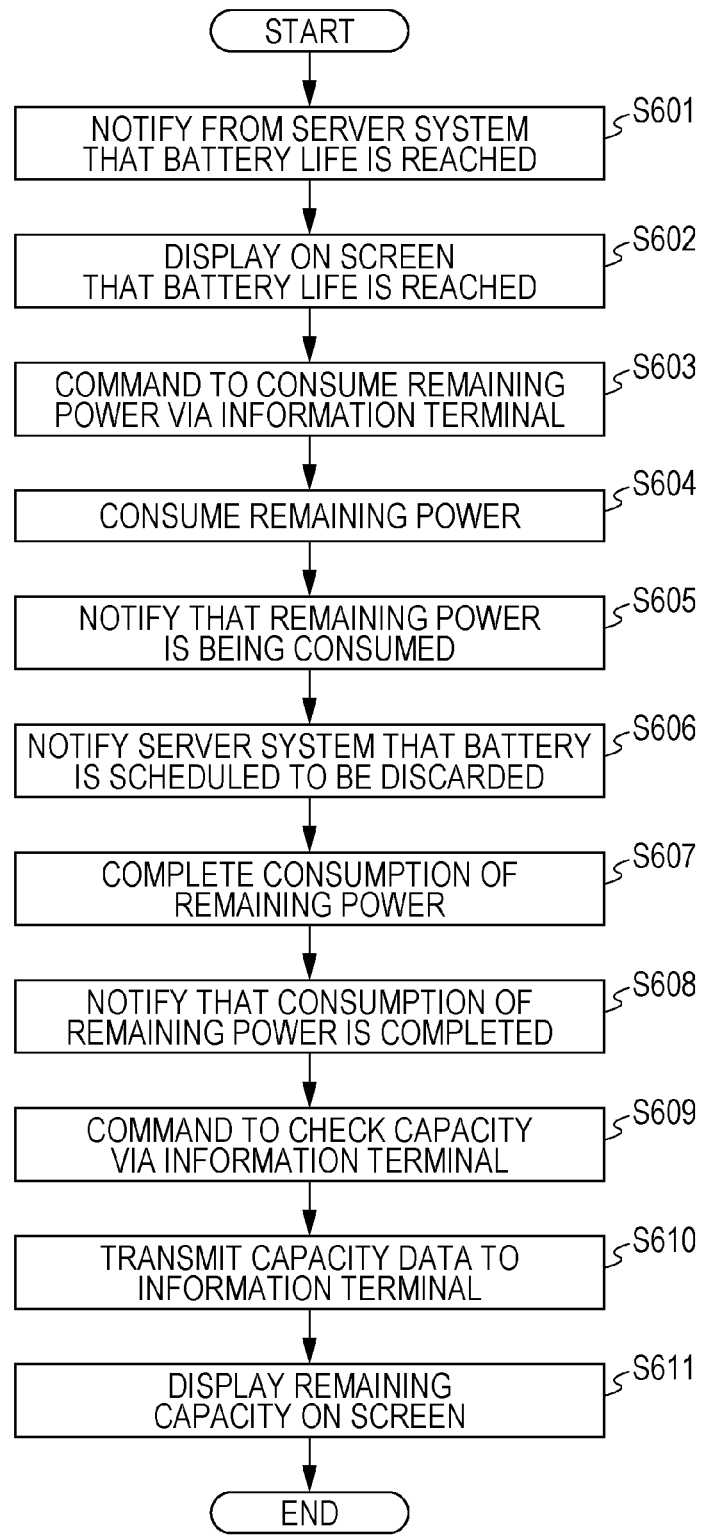
FIG. 17 is a flow chart illustrating an operation of the storage battery pack of the sixth example.

FIG. 17 is a flow chart illustrating the operation of the storage battery pack in the sixth example.

The operation of the storage battery pack 100 in the present example is such that information indicating that the life of the storage battery pack 100 is reached is transmitted to the information terminal 300 from the server system 301 (S601), and the information is displayed on the screen of the information terminal 300 (S602). Although not illustrated in FIG. 16 and FIG. 17, a notifier provided in the storage battery pack 100 may notify an external entity that the battery life is reached. Specifically, the detail of the notification is the same as in the fifth example.

An operator, who has checked that the battery life is reached on the screen of the information terminal 300, operates the information terminal 300, and commands the power consumer 105 to consume the remaining power of the secondary battery 101 (S603). Then, the switch 103 is closed (ON) by the controller 107, and the circuit 116 is activated and the remaining power of the secondary battery 101 is consumed by the power consumer 105 (S604). In addition, an external entity is notified that the remaining power of the secondary battery 101 is being consumed (S605). The consumption of the remaining power of the secondary battery 101 in S604 is specifically the same as in the first example.

Also, the notification in S605 is specifically the same as in the first example. Examples of an operator include a user, a collection contractor, a waste disposal contractor of the storage battery pack 100. The above-mentioned command by an operator causes a collection contractor 302 to be notified that the storage battery pack 100 is scheduled to be discarded (S606). The notification in S606 is specifically the same as in the third example.

When the switch 103 is opened (OFF) by the controller 107, and the operation of the circuit 116 is stopped, the consumption of the remaining power of the secondary battery 101 is completed (S607). Also, an external entity is notified that the consumption of the remaining power of the secondary battery 101 is completed (S608). Specifically, the notification is the same as in the first example as illustrated in FIG. 16(c).

Next, when an operator operates the information terminal 300 to command the storage battery pack 100 to check the remaining capacity of the storage battery pack 100, the information indicating the remaining capacity of the secondary battery 101 is displayed on the screen of the information terminal 300 (S609 to S611). Specifically, the detail of the display is the same as in the second example.

Seventh Example

A storage battery pack 100 in a seventh example will be described. Unlike the first to fourth examples, in the storage battery pack 100 in the present example, when abnormality is detected by the abnormality detector 112, the controller 107 controls the power consumer 105 to consume the remaining power of the secondary battery 101 even with no command to the storage battery pack 100 via the receiver 114. Other operational flows are the same as in the first to fourth examples.

Eight Example

A storage battery pack 100 in an eighth example will be described. The storage battery pack 100 in the present example is the storage battery pack 100 according to any one of the second to sixth examples, in which when the consumption of the remaining power of the secondary battery 101 by the power consumer 105 is completed, the controller 107 transmits information indicating the remaining capacity of the secondary battery 101 to an external device via the communicator 111 (or the communicator as the receiver 114). The information indicating the remaining capacity of the secondary battery 101 is held in the storage 106. Although examples of an external device include the information terminal 300, and the server system 301, the external device is not limited to these and may be in any form.

Also, after the consumption of the remaining power of the secondary battery 101 is completed, the controller 107 may transmit the information indicating the remaining capacity of the secondary battery 101 to an external device. In this case, the consumption of the remaining power of the secondary battery 101 is terminated in a state where the capacity is left that allows transmission of the information indicating the remaining capacity of the secondary battery 101 to an external device.

Ninth Example

A storage battery pack 100 in a ninth example will be described. The storage battery pack 100 in the present example is the storage battery pack 100 according to any one of the first to eighth examples, in which the secondary battery 101 includes cells, and before the voltages of all the cells reach 0 V, the controller 107 stops the consumption of the remaining power of the secondary battery 101 by the power consumer 105.

When the secondary battery includes cells, it is preferable that the cells have an uniform degree of deterioration (SOH). However, the cells exhibit different degrees of deterioration as the storage battery pack is used more often. Therefore, when the remaining power of the secondary battery is consumed, the voltages of the cells are varied, and in some cells, the voltage reaches 0 V relatively early. When those cells with the reached 0 V are further discharged, polarity inversion occurs, and there arises a problem in safety.

Thus, as in the present example, consumption of the power of the secondary battery by the power consumer is terminated before the voltages of all the cells reach 0 V, thereby reducing the number of cells in which polarity inversion occurs and improving the safety compared with the case where the power is discharged until the voltages of all the cells reach 0 V.

In the storage battery pack 100 in the present example, when the voltage of at least one cell is 0 V and before the voltages of all the cells reach 0 V, the controller 107 may stop the consumption of the remaining power of the secondary battery 101 by the power consumer 105.

Tenth Example

A storage battery pack 100 in a tenth example will be described. The storage battery pack 100 in the present example is the storage battery pack 100 according to any one of the first to ninth examples, in which when the storage battery pack 100 is connected to an electrical appliance via the connector and the power consumer 105 is consuming the remaining power of the secondary battery 101, the electrical appliance also consumes the remaining power of the secondary battery 101 until the voltage of the secondary battery 101 reaches a discharge cutoff voltage. In this manner, completion of the consumption of the remaining power of the secondary battery 101 may be made earlier.

The above-mentioned electrical appliance may be an electrical appliance such as an electric mobile body, an air conditioner, a lighting device, that operates using the power of the secondary battery 101. Also, as long as the above-mentioned electrical appliance is provided with a load for discharge internally, the electrical appliance may not operate using the power of the secondary battery 101. For instance, the above-mentioned electrical appliance may be the charging device 200 as long as a load for discharge is internally provided in the charging device 200.

Second Embodiment

At the start of charging the secondary battery, the storage battery pack 100 may discharge (learning discharge) the secondary battery for determining whether or not continuous use of the secondary battery is allowed, by the control of the controller 107. Hereinafter, the storage battery pack 100 according to a second embodiment will be described. In the following second embodiment, points different from the first embodiment will be mainly described, and a description of the components already described in the first embodiment is omitted.

Figure 18:
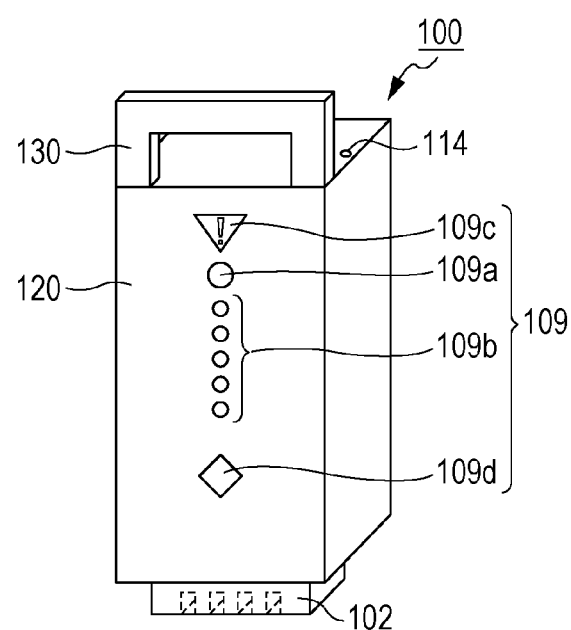
FIG. 18 is a perspective view of the storage battery pack in the second embodiment.

First, the storage battery pack according to the second embodiment will be described. FIG. 18 is a perspective view of the storage battery pack in the second embodiment.

The storage battery pack 100 includes a discharge displayer 109d. The discharge displayer 109d displays at least one of information indicating that the controller 107 of the storage battery pack 100 is in learning discharge and information indicating whether or not continuous use of the secondary battery 101 is allowed. Specifically, the discharge displayer 109d includes an LED, and blinks the LED during learning discharge, and lights up the LED when it is determined that continuous use of the secondary battery 101 is not possible. The detail of the learning discharge and determination as to whether or not continuous use of the secondary battery is allowed will be described later.

Figure 19:
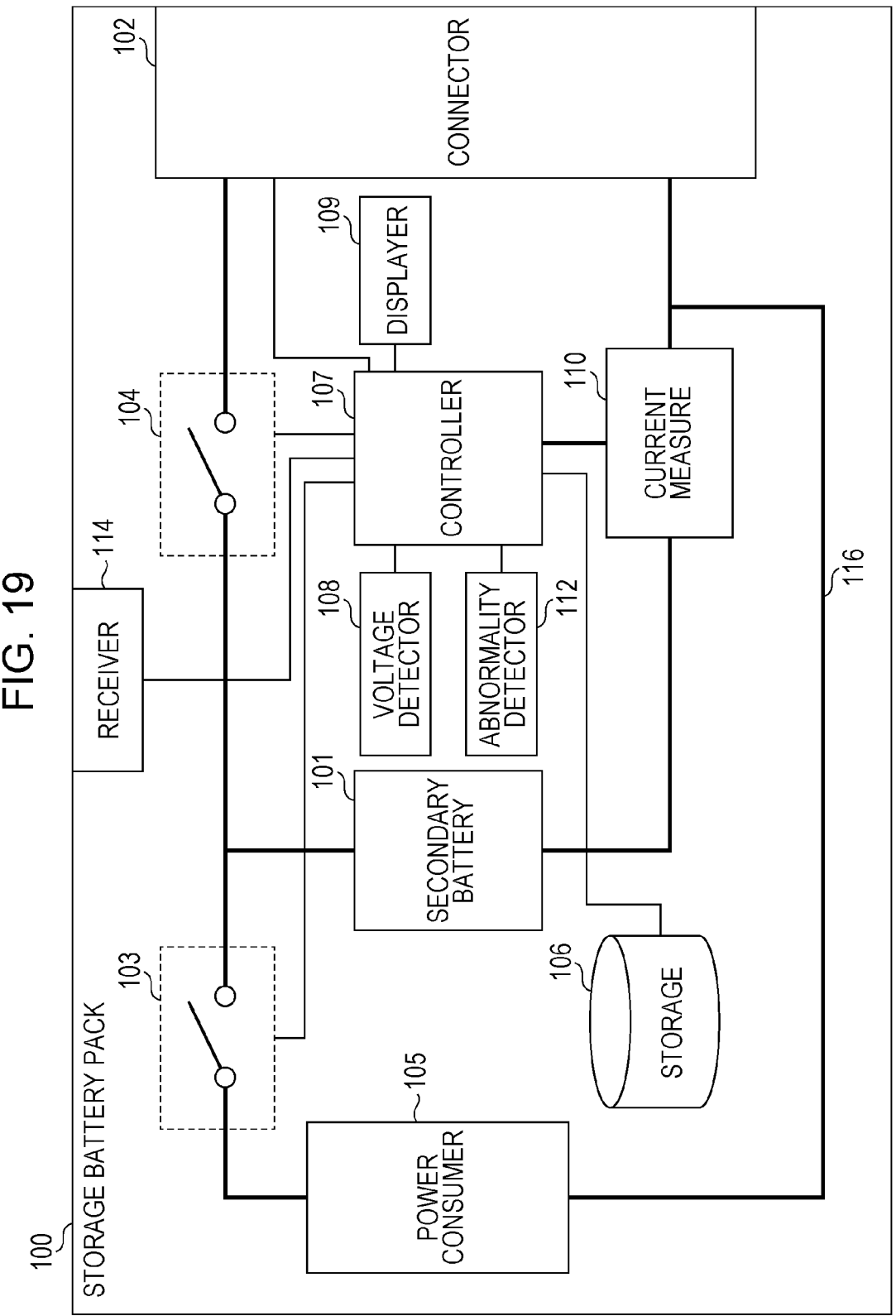
FIG. 19 is a system configuration diagram of the storage battery pack in the second embodiment.

FIG. 19 is a block diagram illustrating the system configuration of the storage battery pack 100 according to the second embodiment.

As illustrated in FIG. 19, the storage battery pack 100 includes a current measure 110.

The current measure 110 is a current sensor disposed at a position which allows measurement of both the current flowing from the secondary battery 101 to an electrical appliance connected to the connector 102, and the current flowing from the secondary battery 101 to the power consumer 105. Specifically, the current measure 110 is disposed between the secondary battery 101 and the power consumer 105 on the circuit. Measurement data of a current value measured by the current measure 110 is transmitted to the controller 107. For instance, when the secondary battery 101 is to be completely discharged, the controller 107 observes the current value measured by the current measure 110, and discharges the secondary battery 101 until the current value becomes sufficiently small.

In the storage battery pack 100 in the present embodiment, the controller 107 determines whether or not continuous use of the secondary battery 101 is allowed, based on the amount of discharge of the secondary battery 101, the discharge causing the value indicating the remaining capacity of the secondary battery 101 to change from the value indicating full charge to the first threshold value or less.

Upon detecting the start of charge (for instance, signal indicating the start of charge) of the secondary battery 101 in a state where the connector 102 is connected to the charging device 200, the controller 107 performs learning discharge. The learning discharge is such discharge (first discharge) that causes the secondary battery 101 to discharge using the power consumer 105 until the value indicating the remaining capacity of the secondary battery 101 falls below the first threshold value for determining whether or not continuous use of the secondary battery 101 is allowed.

In addition, when it is determined that continuous use of the secondary battery 101 is not possible, the controller 107 causes the power consumer 105 to further consume the remaining power of the secondary battery 101. The consumption of the remaining power of the secondary battery 101 may be made after the receiver 114 receives a command for the remaining power consumption of the secondary battery 101, or may be made by the control of the controller 107 without receiving the above-mentioned command by the receiver 114. In the present embodiment, the secondary battery 101 is discharged using the power consumer 105 until the value indicating the remaining capacity of the secondary battery 101 falls below the third threshold value which is less than the first threshold value (second discharge). The third threshold value may be a value less than the discharge cutoff voltage. The third threshold value may be a value for which the secondary battery 101 is in an unusable state. Here, an unusable state of the secondary battery 101 means a state where the storage battery pack 100 is unable to be used as a battery even if it is charged after the consumption of the remaining power of the secondary battery 101 by the power consumer 105 is completed.

The detail of the determination as to whether or not continuous use is allowed, the first discharge, and the second discharge mentioned above will be described later.

[Basic Operation]

Figure 20:
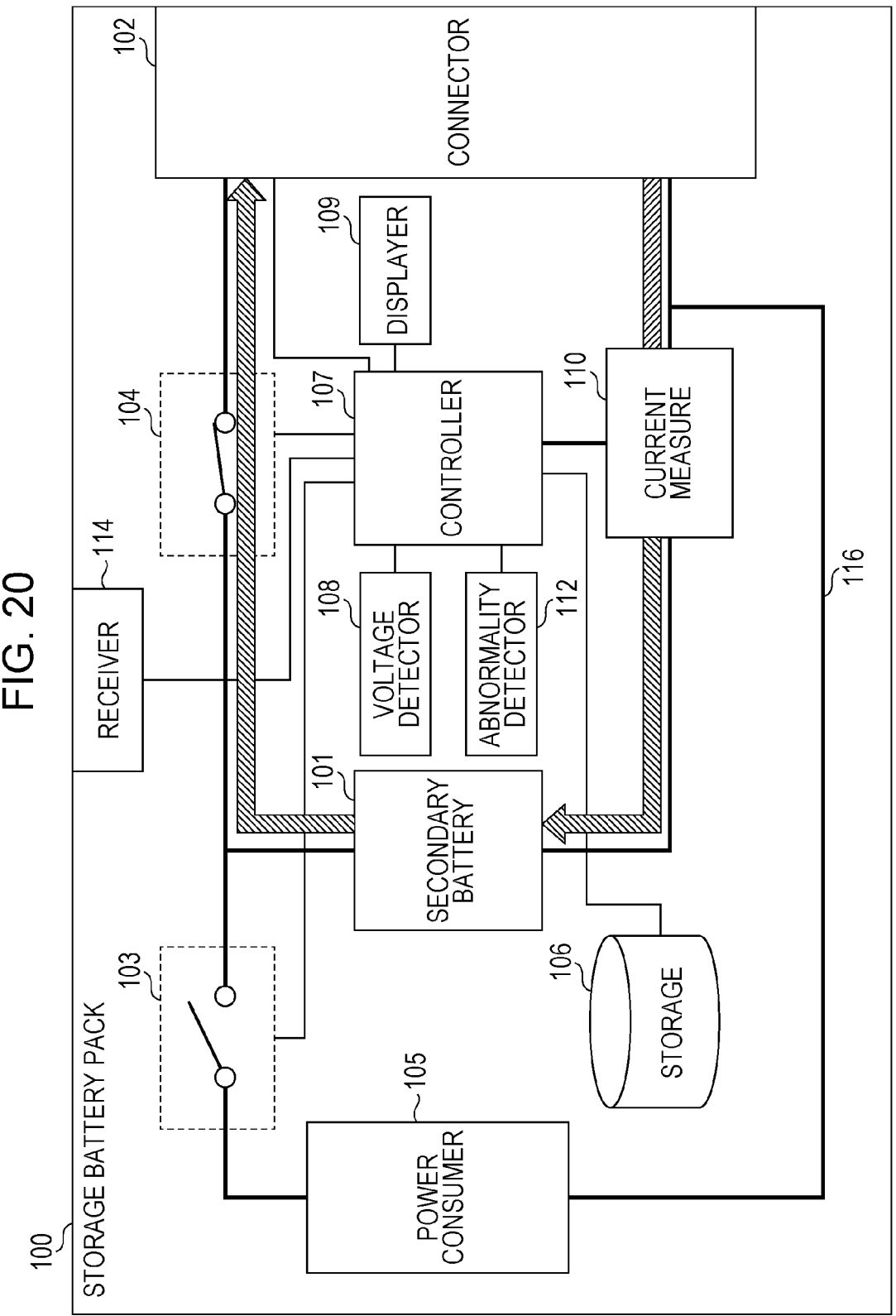
FIG. 20 is a first diagram for explaining the basic operation of the storage battery pack according to the second embodiment.
Figure 21:
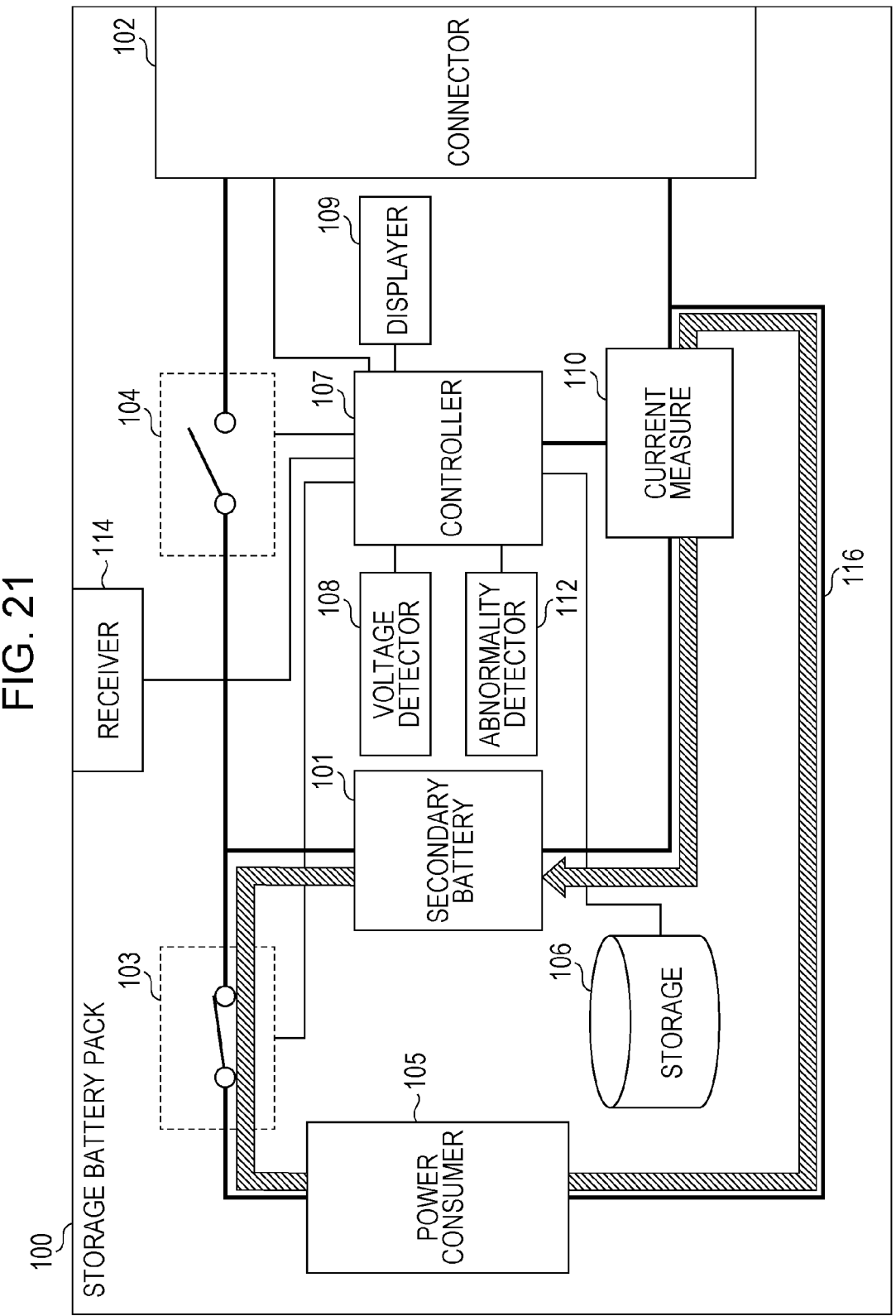
FIG. 21 is a second diagram for explaining the basic operation of the storage battery pack according to the second embodiment.
Figure 22:
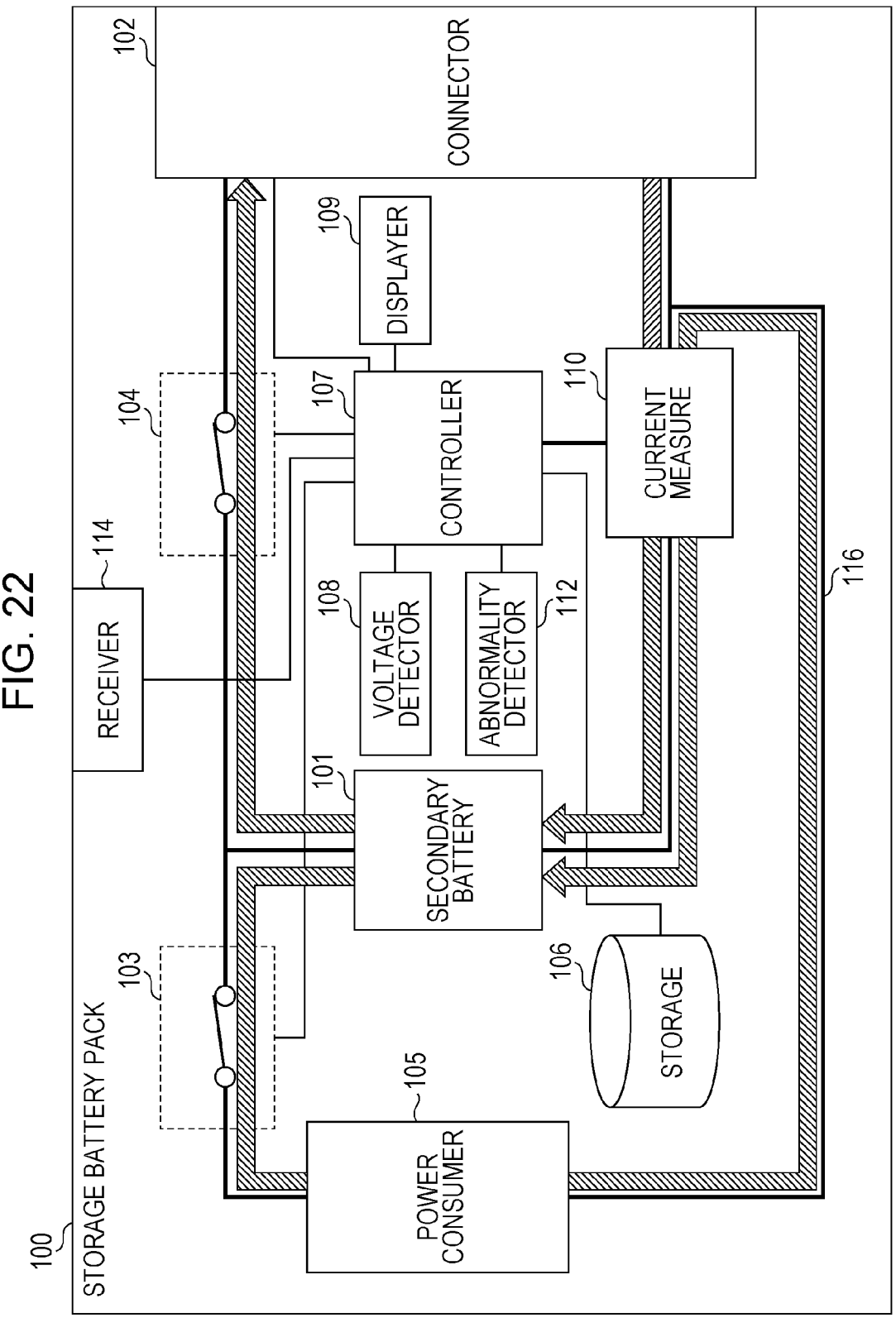
FIG. 22 is a third diagram for explaining the basic operation of the storage battery pack according to the second embodiment.

Next, the basic operation of the storage battery pack 100 will be described. FIG. 20, FIG. 21, and FIG. 22 are diagrams for explaining the basic operation of the storage battery pack 100.

When power is supplied to an electrical appliance connected to the connector 102, the controller 107 turned off the switch 103 and turned on the switch 104 as illustrated in FIG. 20. The current value at this point is measurable by the current measure 110.

When the secondary battery 101 is charged, the controller 107 also turned off the switch 103 and turned on the switch 104. To achieve a full charge state of the secondary battery 101, the controller 107 charges the secondary battery 101 until the voltage value of the secondary battery 101 reaches an upper limit (for instance, 4.1 V) indicating full charge. The upper limit here may be a standard value (charge cutoff voltage) for charge of the secondary battery 101.

When the secondary battery 101 is discharged using the power consumer 105, that is, when the first discharge and the second discharge mentioned above are performed, the controller 107 turned on the switch 103 and turned off the switch 104 as illustrated in FIG. 21. The current value at this point is measurable by the current measure 110.

Here, in the first discharge, the controller 107 discharges the secondary battery 101 until the voltage value of the secondary battery 101 reaches the first threshold value (for instance, 3.3 V). It is to be noted that the first threshold value is greater than the discharge cutoff voltage (for instance, 3.2 V) which is a standard value that allows discharge of the secondary battery 101. Alternatively, in the first discharge, the secondary battery 101 may be discharged until the voltage value of the secondary battery 101 reaches the discharge cutoff voltage.

In the second discharge, the controller 107 discharges the secondary battery 101 until the voltage value of the secondary battery 101 falls below the third threshold value which is less than the first threshold value. Alternatively, in the second discharge, the secondary battery 101 may be discharged until the voltage value falls below the discharge cutoff voltage, which is a state where the secondary battery 101 is unable to be used again. Although the third threshold value is, for instance, 0 V, an unusable state of the secondary battery 101 may be achieved using a voltage (for instance, approximately 1.5 V) lower than the discharge cutoff voltage.

It is to be noted that in order to speed up discharging of the secondary battery 101, the controller 107 may turn on the switch 103 and may turn off the switch 104 as illustrated in FIG. 22. In other words, when an electrical appliance is connected to the connector 102, the secondary battery 101 may be discharged using both the power consumer 105 and the electrical appliance connected to the connector 102. In this manner, it is possible to speed up discharging of the secondary battery 101. It is to be noted that the electrical appliance connected to the connector 102 is an electrical appliance that operates using the power of the secondary battery 101, for instance. Although the charging device 200 is not an electrical appliance that operates using the power of the secondary battery 101, when a load for discharge of the secondary battery 101 is provided in the charging device 200, such a load may be used for the discharge of the secondary battery 101. Therefore, the above-mentioned electrical appliance may include the charging device 200 in the case where a load for discharge is internally provided. Discharge using the power consumer 105 and the electrical appliance may be performed in any one of the first discharge and the second discharge. Although the voltage value is used as a value that indicates the remaining capacity of the secondary battery 101 in the above-described example, without being limited to this, the remaining capacity itself may be used. For calculation of the remaining capacity itself, a value obtained by time-integrating the current value measured by the current measure 110 is used.

[First Discharge and Second Discharge]

Next, the first discharge and the second discharge, which are characteristic configuration of the storage battery pack 100, will be described in detail.

Figure 23:
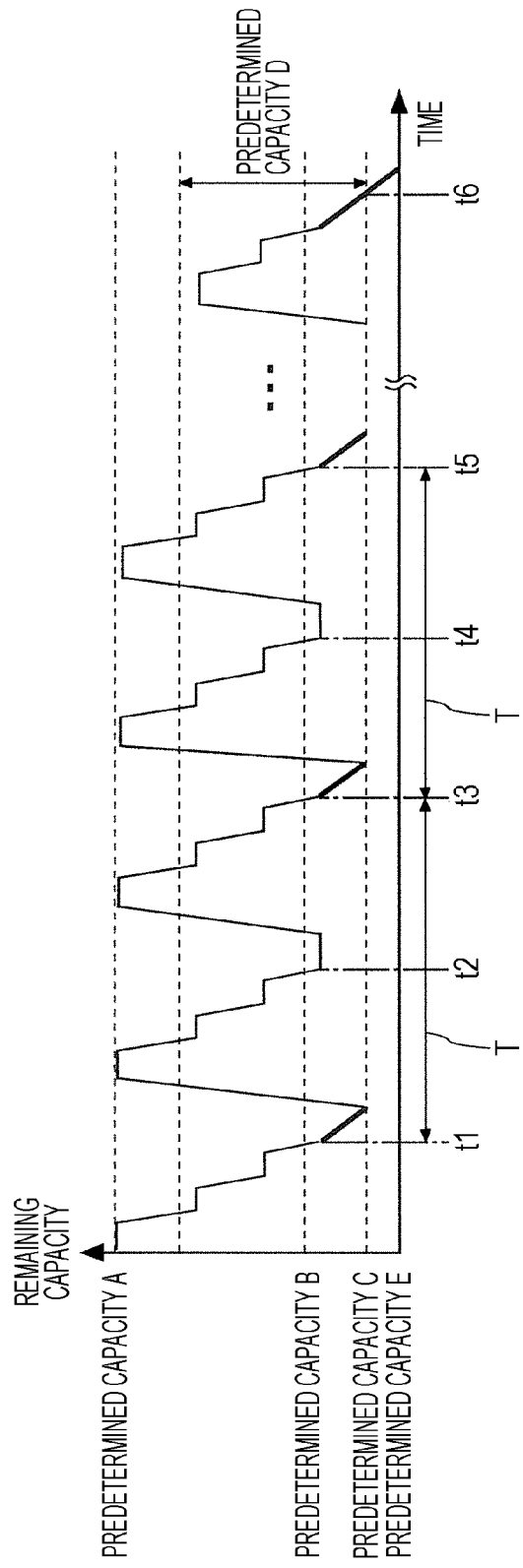
FIG. 23 is a graph for explaining first discharge and second discharge of a secondary battery.

The first discharge refers to the discharge that causes the secondary battery 101 to discharge until a predetermined capacity (predetermined voltage value) is reached in order to determine whether or not continuous use of the secondary battery 101 is allowed. The storage battery pack 100 is characteristic in that when the secondary battery 101 is charged, such learning discharge is performed using the power consumer 105 provided in the storage battery pack 100. FIG. 23 is a graph for explaining the first discharge and the second discharge of the secondary battery 101. FIG. 23 is a graph schematically illustrating a temporal change in the capacity (remaining capacity) of the secondary battery 101.

In the second embodiment, determination as to whether or not continuous use is allowed is made based on whether or not the maximum capacity of the secondary battery 101 is less than a predetermined capacity D. Here, the maximum capacity of the secondary battery 101 is the difference between the capacity (the capacity when charging is performed until the voltage reaches a predetermined upper limit) at the time of full charge and a predetermined capacity C (the capacity when the voltage reaches the first threshold value).

The maximum capacity of the secondary battery 101 is calculated based on the amount of discharge that causes the capacity at the time of full charge to decrease to the predetermined capacity C. Specifically, the controller 107 stores the above-mentioned amount of discharge in the storage 106, and accumulated stored amount of discharge is calculated as the maximum capacity of the secondary battery 101.

Here, as illustrated in FIG. 23, when the secondary battery 101 is started to be used, the capacity at the time of full charge is a predetermined capacity A. However, the capacity gradually decreases due to repeated charge and discharge, and thus, the maximum capacity of the secondary battery 101 also decreases. When the maximum capacity of the secondary battery 101 falls below the predetermined capacity D, it is determined that continuous use of the secondary battery 101 is not possible.

As described above, in order to calculate the maximum capacity of the secondary battery 101, the secondary battery 101 has to be discharged to the predetermined capacity C.

Thus, in the storage battery pack 100, upon detecting a signal indicating the start of charge, when the remaining capacity of the secondary battery 101 is greater than the predetermined capacity C and less than or equal to the predetermined capacity B, the controller 107 performs the first discharge until the capacity of the secondary battery 101 reduces to the predetermined capacity C. In other words, upon detecting a signal indicating the start of charge, when the voltage of the secondary battery 101 is greater than the first threshold value and less than or equal to the second threshold value (for instance, 3.5 V), the controller 107 performs learning discharge. The second threshold value is a value less than the predetermined upper limit that indicates full charge.

In this manner, the first discharge is performed when the remaining capacity of the secondary battery 101 is small. Thus, the controller 107 is able to cause the secondary battery 101 to discharge in a short time.

Since the capacity of the secondary battery 101 is not likely to decrease significantly in a short time, determination as to whether or not continuous use is allowed does not have to be made frequently. Frequent learning discharge may cause a disadvantage that deterioration of the secondary battery 101 is promoted.

Thus, in the first embodiment, the history of learning discharge is stored in the storage 106, and the controller 107 performs subsequent learning discharge when a predetermined period T has elapsed since the last learning discharge is performed.

For instance, in FIG. 23, a signal indicating the start of charge is detected at each of timing t1, t2, t3, and t4, and at each timing, the remaining capacity of the secondary battery 101 greater than the predetermined capacity C and less than or equal to the predetermined capacity B.

Here, although learning discharge is started at timing t1 and t3, learning discharge is not performed at timing t2 and only charge is performed because the predetermined period T has not elapsed at timing t1 since learning discharge is started. Similarly, at timing t4, learning discharge is not performed because the predetermined period T has not elapsed since learning discharge is started at timing t3.

In this manner, in the first embodiment, learning discharge of the secondary battery 101 is performed not for every charge of the secondary battery 101 but based on the condition of lapse of a predetermined period. Therefore, unnecessary discharge may be reduced in a situation where the time interval between charges is short and a variation of the battery life is estimated to be low. Furthermore, it is possible to suppress deterioration (reduction in the life) of the secondary battery 101 by reducing the number of times of discharge.

Next, the second discharge will be described with reference to FIG. 23.

When the maximum capacity of the secondary battery 101 falls below the predetermined capacity D and it is determined that continuous use of the secondary battery 101 is not possible, the controller 107 performs the second discharge. Specifically, the controller 107 causes the secondary battery 101 to discharge using the power consumer 105 until the remaining capacity of the secondary battery 101 reaches a predetermined capacity E. In other words, the controller 107 causes the secondary battery 101 to discharge using the power consumer 105 until the value indicating the remaining capacity of the secondary battery 101 falls below the third threshold value which is less than the first threshold value.

For instance, in FIG. 23, as a result of performing learning discharge, it is determined at timing t6 that continuous use of the secondary battery 101 is not possible. Therefore, the controller 107 performs the second discharge.

Figure 24:
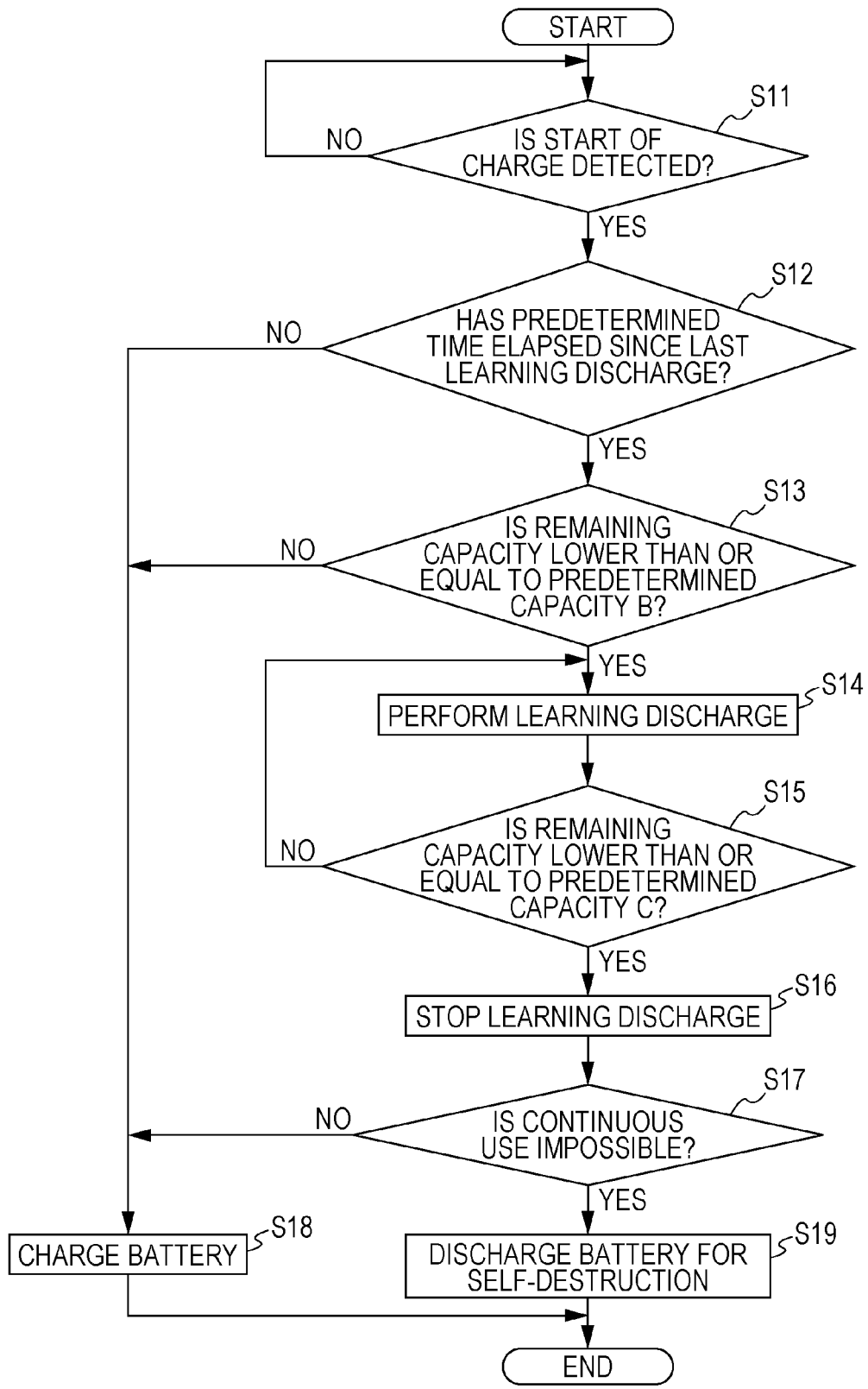
FIG. 24 is a flow chart for the first discharge and the second discharge.

The first discharge and the second discharge explained above will be further described using a flow chart. FIG. 24 is a flow chart of the first discharge and the second discharge.

First, the controller 107 detects a signal indicating the start of charge of the secondary battery 101 (S11). The controller 107 detects, for instance, connection of the storage battery pack 100 to the charging device 200 as a signal indicating the start of charge. Also, after the storage battery pack 100 is connected to the charging device 200, a signal indicating the start of charge may be transmitted to the controller 107 triggered by an operation (for instance, depressing a charge start button) performed on the storage battery pack 100 or the charging device 200.

Upon detecting a signal indicating the start of charge (Yes in S11), the controller 107 refers to the history of learning discharge in the storage 106 and checks to see whether or not a predetermined period has elapsed since the last learning discharge (S12).

When a predetermined period has elapsed since the last learning discharge (Yes in S12), the controller 107 checks the remaining capacity of the secondary battery 101 (S13). When the remaining capacity of the secondary battery 101 is less than or equal to the predetermined capacity B (Yes in S13), the controller 107 performs learning discharge (S14).

The learning discharge is performed until the remaining capacity reaches the predetermined capacity C (No in S15). When the remaining capacity reaches the predetermined capacity C (Yes in S15), the controller 107 stops the learning discharge (S16), and determines whether or not continuous use of the secondary battery 101 is allowed (S17).

When it is determined that continuous use of the secondary battery 101 is allowed (No in S17), the secondary battery 101 is charged (S18). In addition, when the predetermined period has not elapsed since the last learning discharge (No in S12) or when the remaining capacity of the secondary battery 101 is greater than the predetermined capacity B (No in S13), the secondary battery 101 is charged.

When it is determined that continuous use of the secondary battery 101 is not possible (Yes in S17), the controller 107 performs the second discharge (S19).

Effects

As described above, in the storage battery pack 100 according to the first embodiment, when a signal indicating the start of charge of the secondary battery 101 is detected in a state where the connector 102 is connected to the charging device 200, the first discharge is performed.

In this manner, the first discharge is performed at the time of charge, thus a user does not have to cause the secondary battery 101 to perform learning discharge separately in order to determine whether or not continuous use is allowed. Also, since learning discharge is performed on the secondary battery 101 at the time of charge when the amount of stored power is estimated to be low, the time taken for the learning discharge may be reduced.

Since the secondary battery is discharged at the appropriate timing as described above, the time, in which the storage battery pack 100 is available to a user for power supply to an appliance, is secured, and thus the convenience of the storage battery pack 100 may be improved.

Also, in the storage battery pack 100, when it is determined that continuous use of the secondary battery 101 is not possible, the second discharge is performed.

Even when the secondary battery 101 is discarded after being discharged until the discharge cutoff voltage is reached, the remaining capacity of the secondary battery 101 is still left, and thus a handler of the secondary battery 101 may have electric shock or suffer burns due to heat generation during discard processing. Particularly, when the secondary battery 101 is a lithium-ion battery, such a dangerous occurrence is probable, and thus a safe method of discarding batteries is demanded.

In the second discharge, the secondary battery 101, which is determined to be unable to be used continuously, is discharged until the voltage falls below the discharge cutoff voltage, thereby achieving an unusable state (a state unable to be used as a battery even after recharged) of the storage battery pack 100. In such a situation, it is possible to reduce the possibility of occurrence of burns, electric shock, and thus the safety in discarding the storage battery pack 100 may be improved.

Modification

In the second embodiment, in order to start learning discharge, the following condition has to be satisfied: a first predetermined period T has elapsed since the last learning discharge and the voltage of the secondary battery 101 is less than or equal to the second threshold value. In this situation, for instance, when learning discharge has not been performed for at least a second predetermined period (for instance, 2T) longer than the predetermined period T, the second threshold value may be increased. The second threshold value is increased from 3.5 V to 3.7 V, for instance.

Thus, when learning discharge has not been performed for a long period, learning discharge tends to be performed, and thus determination as to whether or not continuous use is allowed may be made more reliably.

Third Embodiment

A storage battery pack 100 according to the third embodiment will be described. In the following third embodiment, points different from the second embodiment will be mainly described, and a description of the components already described in the second embodiment is omitted.

The storage battery pack 100 according to the third embodiment includes a communicator that communicates with an external device. The system configuration of the storage battery pack 100 is the same as the system configuration of the storage battery pack described with reference to FIG. 7.

In the storage battery pack 100 in the present embodiment, the communicator 111 transmits data of state value indicating the state of the secondary battery 101 to an external device. The communicator 111 receives information indicating a state of the secondary battery 101 from an external device, and thus the controller 107 is able to check the state of the secondary battery 101, the state being determined by the external device based on the above-described data. Here, examples of an external device include a server system, an information terminal, and a charging device.

The communicator 111 may transmit an amount of discharge of the secondary battery 101 to an external device, and may receive from the external device information indicating whether or not continuous use of the secondary battery 101 is allowed, the discharge causing the value indicating the remaining capacity of the secondary battery 101 to change from the value indicating full charge to the first threshold value or less, for instance. In short, determination as to whether or not continuous use of the secondary battery 101 is allowed may be made by an external device.

The communicator 111 may transmit to an external device, for instance, at least one of information indicating that the controller 107 is in learning discharge and information indicating whether or not continuous use of the secondary battery 101 is allowed. Thus, it is possible for an external device to hold information indicating the state of the secondary battery 101.

In addition, the communicator 111 receives a signal that controls the switch 103 and the switch 104 from an external device, thereby making it possible to switch (remote control) between charge and discharge of the secondary battery 101.

Fourth Embodiment

In a fourth embodiment, typically, the power consumer 105 may also include a resistor for cell balance. Hereinafter, a storage battery pack 100 according to the fourth embodiment will be described. In the following fourth embodiment, points different from the first and second embodiments will be mainly described, and the configuration other than this is the same as the configuration of one of the first embodiment and the second embodiment, and thus a specific description is omitted.

Figure 25:
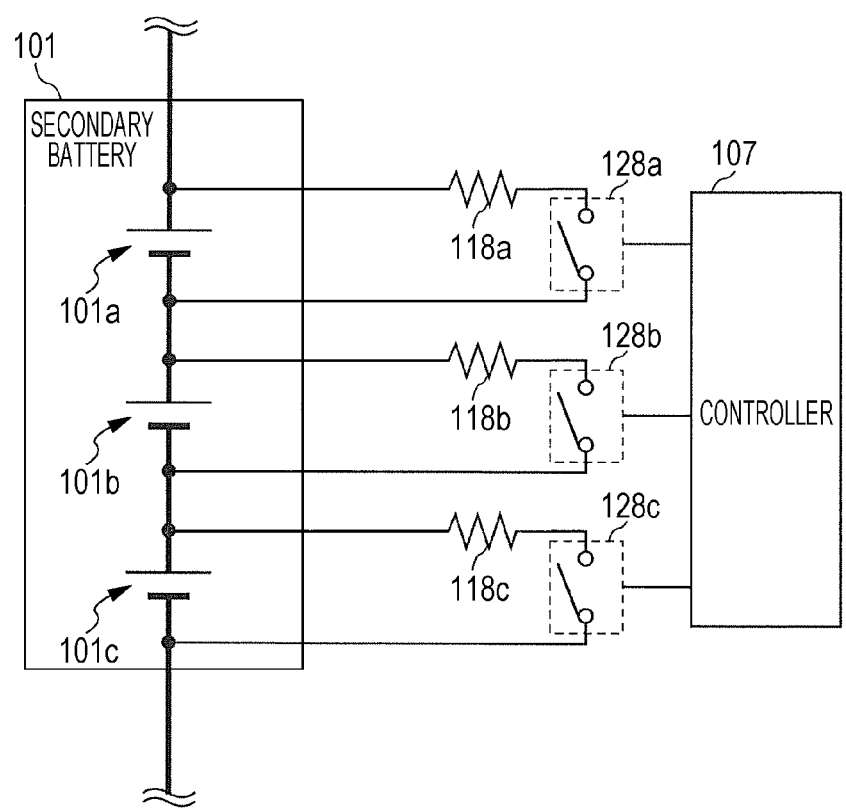
FIG. 25 is a diagram for explaining a resistor for cell balance.

FIG. 25 is a diagram for explaining a resistor for cell balance. FIG. 25 is a schematic diagram and the number of cells is simplified for the sake of explanation.

As illustrated in FIG. 25, the secondary battery 101 is formed of, for instance, a cell 101a, a cell 101b, and a cell 101c connected in series.

A storage battery pack 100 in the present embodiment includes one resistor for cell balance and one switch for each cell in order to adjust the voltages between the cells. The controller 107 controls ON or OFF of switches provided correspondingly to the cells.

For instance, when the switch 128a is turned ON or turned OFF by the controller 107, the electrical connection between the resistor 118a for cell balance and the cell 101a is turned ON or turned OFF. Similarly, when the switch 128b is turned ON or turned OFF, the electrical connection between the resistor 118b for cell balance and the cell 101b is turned ON or turned OFF. When the switch 128c is turned ON or turned OFF, the electrical connection between the resistor 118c for cell balance and the cell 101c is turned ON or turned OFF.

With the configuration described above, the controller 107 is capable of discharging each cell individually and adjusting the voltages between the cells. Such a resistor for cell balance may be used as the power consumer 105.

Fifth Embodiment

The storage battery pack 100 may include a heater (heating element) as the power consumer 105. Hereinafter, a storage battery pack including a heater according to a fifth embodiment will be described. In the following fifth embodiment, points different from the first embodiment will be mainly described, and a description of the components already described in the first embodiment is omitted.

Figure 26:
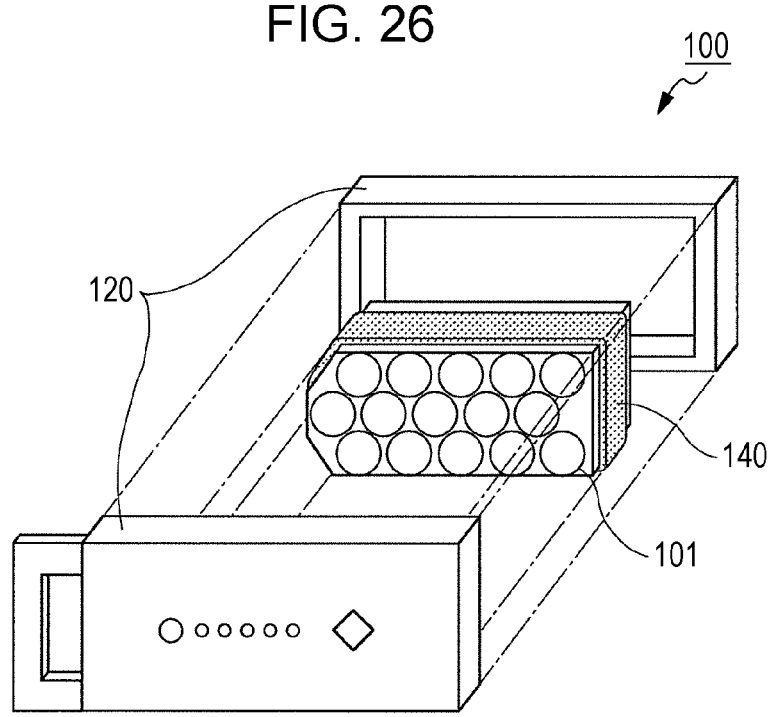
FIG. 26 is a perspective view illustrating an internal configuration of the storage battery pack according to the fifth embodiment.
Figure 27:
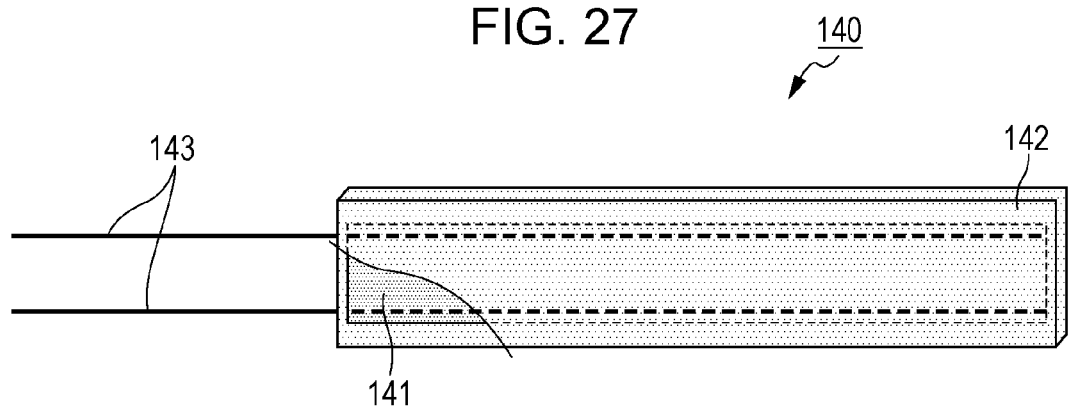
FIG. 27 is a view illustrating the configuration of a heater according to the fifth embodiment.

FIG. 26 is a perspective view illustrating the internal configuration of the storage battery pack according to the fifth embodiment. FIG. 27 is a view illustrating the configuration of the heater according to the fifth embodiment. It is to be noted that illustration of the connector 102 is omitted in FIG. 26.

As illustrated in FIG. 26, the storage battery pack 100 according to the fifth embodiment differs from the storage battery pack 100 according to the first embodiment in that the power consumer 105 is a heating element that generates heat by consuming the power discharged by the secondary battery 101. In addition, a heater 140 as an example of a heating element surrounds the periphery of the secondary battery 101.

As illustrated in FIG. 27, specifically, the heater 140 includes an exothermic element 141, and an insulator 142 that covers the exothermic element 141. The exothermic element 141 is connected to one end of a lead wire 143, and the other end of the lead wire 143 is connected to the secondary battery 101. The lead wire 143 is connected to the switch 103, and the switch 103 switches between ON and OFF of electrical connection between the secondary battery 101 and the heater 140 based on the control of the controller 107.

With the configuration like this, when the controller 107 performs control to cause the secondary battery 101 to discharge, the secondary battery 101 is heated by the heat generated by the heater 140. Thus, it is possible to protect against performance degradation caused by decrease in the temperature of the secondary battery 101.

Alternatively, the storage battery pack 100 may include a temperature detector (not illustrated) that detects the temperature inside the storage battery pack 100. In this case, when the temperature inside the storage battery pack 100 decreases, the controller 107 discharges the secondary battery 101.

Figure 28:
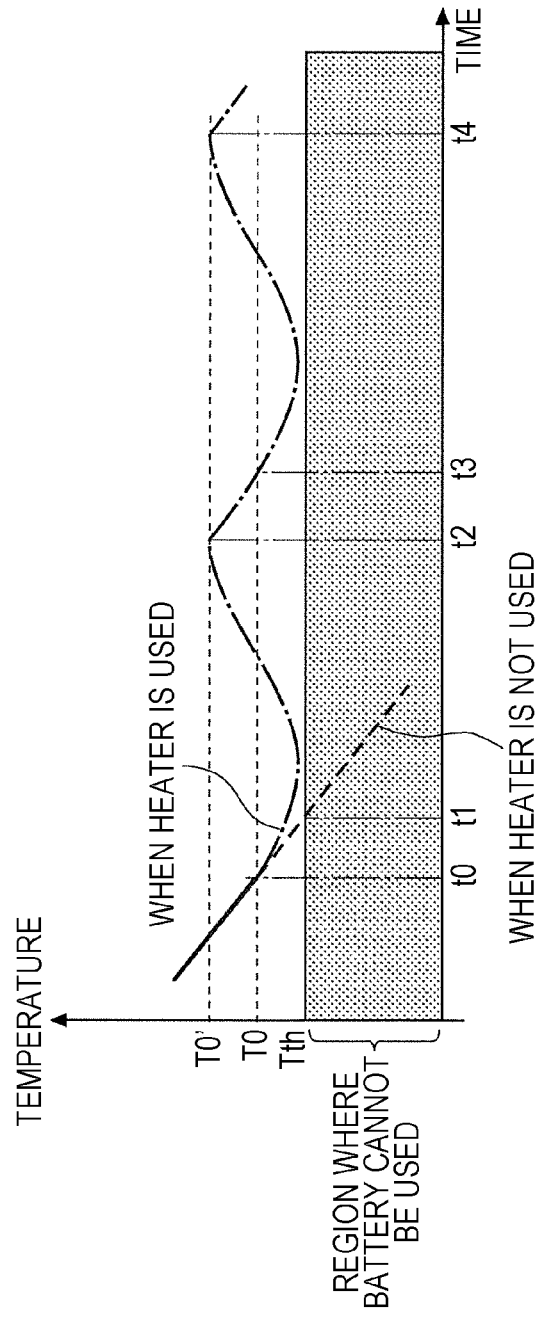
FIG. 28 is a graph for explaining an operational example of the storage battery pack according to the fifth embodiment.

Specifically, when the temperature detector detects that the temperature inside the storage battery pack 100 is less than or equal to a threshold value temperature, the controller 107 discharges the secondary battery 101, and heater 140 consumes power and generates heat. Since the heater 140 surrounds the periphery of the secondary battery 101, the secondary battery 101 is heated by the heat generated by the heater 140. Consequently, when the temperature is low, it is possible to avoid decrease of the temperature of the secondary battery 101. The control of such controller 107 will be described with reference to FIG. 28. FIG. 28 is a graph for explaining an operational example of the storage battery pack according to the fifth embodiment.

As illustrated in FIG. 28, when it is detected that the temperature inside the storage battery pack 100 is less than or equal to a threshold value temperature T0, the controller 107 causes the secondary battery 101 to discharge, and the heater 140 consumes power and generates heat. At this point, the threshold value temperature T0 is set higher than a boundary temperature Tth at or below which the secondary battery 101 is unable to be used.

Subsequently, when it is detected that the temperature inside the storage battery pack 100 is higher than or equal to a threshold value temperature T0' which is higher than the threshold value temperature T0, the controller 107 stops the discharge of the secondary battery 101. In other words, the controller 107 stops generation of heat by the heater 140.

When the secondary battery 101 is a lithium-ion battery, the boundary temperature Tth, at or below which the secondary battery 101 is unable to be used, is approximately 0° C. Therefore, it is preferable that the threshold value temperature T0 be set to approximately 10° C., and the threshold value temperature T0' be set to approximately 15° C. It is to be noted that specific values of the temperatures Tth, T0, and T0' are only examples, and the temperatures are not limited to these examples.

With the configuration described above, it is possible to avoid temperature decrease down to a temperature at which the secondary battery 101 is unable to be used in a low temperature environment, and to control heat generation by the heater 140 to avoid excessive heating of the secondary battery 101. In other words, it is possible to reduce unnecessary discharge of the secondary battery 101 and to protect against performance degradation of the secondary battery 101 at a low temperature.

It is to be noted that the heater 140 does not have to surround the periphery of the secondary battery 101 in contact with the lateral faces thereof. The heater 140 may be mounted on a portion of the secondary battery 101 as long as the heater 140 is able to heat the secondary battery 101.

Other Embodiments

Although the first to fifth embodiments have been described above, the present disclosure is not limited to the first to fifth embodiments.

Figure 29:
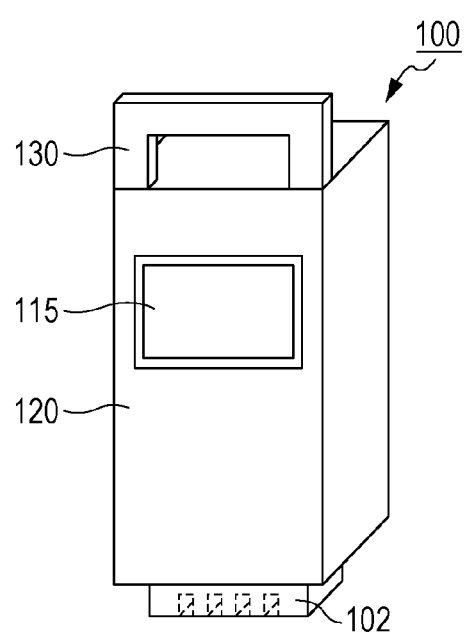
FIG. 29 is a perspective view of the storage battery pack including an image displayer.

For instance, the storage battery pack may include an image displayer having a display screen, and the function of the displayer 109, which has been described in the embodiments, may be achieved by the image displayer. FIG. 29 is a perspective view of the storage battery pack including an image displayer.

The storage battery pack 100 illustrated in FIG. 29 includes an image displayer 115. The image displayer 115 includes, for instance, a display panel such as an organic EL panel, an LCD panel.

The image displayer 115 is able to display the remaining capacity of the secondary battery 101, information indicating that learning discharge is being performed, information indicating whether or not continuous use of the secondary battery 101 is allowed, and information indicating abnormality of the storage battery pack 100. In addition, the image displayer 115 includes a touch panel, and serves as a user interface. In other words, the image displayer 115 also serves as the remaining amount display button 109a, and the receiver 114.

In the above-described embodiments, when abnormality occurs in the storage battery pack 100, the receiver 114 receives a command and consumption of the remaining power of the secondary battery 101 is made. However, without being limited to this, a command may be issued to the receiver 114 at any timing, and consumption of the remaining power of the secondary battery 101 may be made.

In the above-described embodiments, each component may be formed by dedicated hardware, or may be implemented by executing a software program suitable for the component. Each component may be implemented by a program executor such as a CPU or a processor, that reads and executes a software program recorded on a storage medium such as a hard disk or semiconductor memory.

In the above-described embodiments, the components may be circuits. These circuits may form a single circuits as a whole, or may be separate circuits. Alternatively, these circuits may be general-purpose circuits or may be dedicated circuits.

In the above-described embodiments, processing executed by a specific processor may be executed by another processor. For instance, the voltage detector 108 may be implemented as a function of the controller 107. The order of a plurality of processing may be changed or the plurality of processing may be executed concurrently.

For instance, the present disclosure may be implemented as a method of charging and discharging a storage battery pack.

The present disclosure is not limited to these embodiments or their modifications. The embodiments and their modifications to which various alterations which will occur to those skilled in the art are made, and an embodiment constructed by a combination of components of different embodiments and their modifications without departing from the spirit of the present disclosure are also included within the scope of the present disclosure.

The present disclosure is useful as a storage battery pack that is able to discharge at appropriate timing.

What is claimed is:

1. A storage battery pack comprising:
a secondary battery;
a circuit that includes a power consumer which consumes power of the secondary battery;
terminals for charging to or discharging from the storage battery pack;
a switching element that, when the voltage of the secondary battery reaches the discharge cutoff voltage, is opened to stop discharge of the secondary battery through the terminals;
a controller; and
a memory including a set of executable instructions that, when executed by the controller causes the controller to perform a first discharge operation including:
activating the circuit and causing the power consumer to consume a remaining power of the secondary battery until a voltage of the secondary battery reaches a first threshold value which is higher than the discharge cutoff voltage; and
stopping, when the voltage of the secondary battery reaches the first threshold value, the first discharge operation,
the memory including a set of executable instructions that, when executed by the controller causes the controller to perform a second discharge operation including:
activating the circuit and causing the power consumer to consume the remaining power of the secondary battery until the voltage of the secondary battery reaches a third threshold value which is lower than the discharge cutoff voltage.

2. The storage battery pack according to claim 1, wherein the controller performs the first discharge operation under a condition that
(i) the storage battery pack is connected to a charging device, and
(ii) the voltage of the secondary battery is lower than a second threshold value which is higher than the first threshold value.

3. The storage battery pack according to claim 1, wherein the controller performs the first discharge operation under a condition that the storage battery pack is connected to a charging device,
after the stopping the first discharge operation, the controller automatically closes the switching element to start charging to the secondary battery from the charging device.

4. The storage battery pack according to claim 1, wherein the controller performs the first discharge operation under a condition that the storage battery pack is connected to a charging device,
after the stopping the first discharge operation, the controller automatically closes the switching element to start charging to the secondary battery from the charging device,
after the second discharge operation, the controller does not charge the secondary battery from the charging device regardless of the connection to the charging device.

5. The storage battery pack according to claim 2, wherein after the stopping the first discharge operation, the controller automatically closes the switching element to start charging to the secondary battery from the charging device.

6. The storage battery pack according to claim 2, wherein after the stopping the first discharge operation, the controller automatically closes the switching element to start charging to the secondary battery from the charging device,
after the second discharge operation, the controller does not charge the secondary battery from the charging device regardless of the connection to the charging device.

7. The storage battery pack according to claim 1, wherein the memory including a set of executable instructions that, when executed by the controller causes the controller to perform the second discharge operation including:
stopping, when the voltage of the secondary battery reaches the third threshold value, the second discharge operation.

8. The storage battery pack according to claim 1, further comprising
the secondary battery includes a plurality of cells,
wherein,
the memory including a set of executable instructions that, when executed by the controller causes the controller to perform the second discharge operation including:
stopping, before voltages of all the plurality of cells reach 0 V, the second discharge operation.

9. The storage battery pack according to claim 1, wherein the controller performs the first discharge operation under a condition that
(i) the storage battery pack is connected to a charging device,
(ii) the voltage of the secondary battery is lower than a second threshold value which is higher than the first threshold value, and
(iii) a predetermined period has elapsed since a last first discharge which has been performed.

10. The storage battery pack according to claim 1, further comprises:
a communicator that allows communication with an external entity,
wherein,
the memory including a set of executable instructions that, when executed by the controller, causes the controller to perform operations including:
transmitting state information indicating a remaining capacity of the secondary battery to the external entity via the communicator.

11. The storage battery pack according to claim 1, further comprises:
a communicator that allows communication with an external entity,
wherein,
the memory including a set of executable instructions that, when executed by the controller, causes the controller to perform operations including:
receiving information, via the communicator, indicating command for causing the storage battery pack to check a remaining capacity of the storage battery pack from the external entity, and transmitting, in response for the command, state information indicating the remaining capacity of the secondary battery to the external entity via the communicator.

12. The storage battery pack according to claim 1, wherein,
the memory including a set of executable instructions that, when executed by the controller, causes the controller to perform operations including:
detecting a signal indicating a start of charge,
the controller performs, when the signal indicating the start of charge is detected, the first discharge operation under a condition that
(i) the storage battery pack is connected to a charging device, and
(ii) the voltage of the secondary battery is lower than a second threshold value which is higher than the first threshold value.

13. The storage battery pack according to claim 1, wherein,
the memory including a set of executable instructions that, when executed by the controller, causes the controller to perform operations including:
receiving information, via the communicator, indicating command for causing the storage battery pack to perform the second discharge operation from the external entity, and
performing, in response for the command, the second discharge operation.

14. A battery management method for controlling a storage battery pack including a secondary battery, the battery management method comprising:
performing a first discharge operation under a condition that:
(i) the storage battery pack is connected to a charging device;
(ii) a voltage of the secondary battery is higher than a first threshold value which is higher than a discharge cutoff voltage of the secondary battery; and
(iii) the voltage of the secondary battery is lower than a second threshold value which is higher than the first threshold value,
wherein, the first discharge operation including:
consuming a remaining power of the secondary battery until the voltage of the secondary battery reaches the first threshold value; and
stopping, when the voltage of the secondary battery reaches the first threshold value, the first discharge operation,
performing a second discharge operation under a condition that:
the storage battery pack has been received, from an external entity, a command for causing the storage battery pack to perform the second discharge operation,
wherein, the second discharge operation including:
consuming the remaining power of the secondary battery until the voltage of the secondary battery reaches a third threshold value which is lower than the discharge cutoff voltage.

15. The battery management method according to claim 14, further comprising:
transmitting state information indicating a remaining capacity of the secondary battery to the external entity via a communicator of the storage battery pack.

16. The battery management method according to claim 15, further comprising:
displaying, on a display of the external entity, a remaining capacity of the secondary battery based on the state information.

17. The battery management method according to claim 14, further comprising:
receiving information, via a communicator of the storage battery pack, indicating the command for causing the storage battery pack to perform the second discharge operation from the external entity.

* * * * *